(12) United States Patent
Chen et al.

(10) Patent No.: US 12,216,798 B2
(45) Date of Patent: Feb. 4, 2025

(54) CENTRALIZED DATA TRANSFORMATION IN A MULTI-TENANT COMPUTING ENVIRONMENT

(71) Applicant: Zuora, Inc., Redwood City, CA (US)

(72) Inventors: Weilei Chen, Beijing (CN); Nicolas Fusseder, San Diego, CA (US); Bryan Sheddy, Redwood City, CA (US); Tom Hartwell, Redwood City, CA (US); Henning Schmiedehausen, Los Altos, CA (US)

(73) Assignee: Zuora, Inc., Redwood City, CA (US)

( * ) Notice: Subject to any disclaimer, the term of this patent is extended or adjusted under 35 U.S.C. 154(b) by 293 days.

(21) Appl. No.: 17/832,422

(22) Filed: Jun. 3, 2022

(65) Prior Publication Data

US 2023/0281339 A1    Sep. 7, 2023

Related U.S. Application Data

(60) Provisional application No. 63/316,365, filed on Mar. 3, 2022.

(51) Int. Cl.
*G06F 21/62*    (2013.01)
*G06F 16/25*    (2019.01)

(52) U.S. Cl.
CPC ........ *G06F 21/6254* (2013.01); *G06F 16/256* (2019.01); *G06F 16/258* (2019.01)

(58) Field of Classification Search
CPC ... G06F 21/6254; G06F 16/256; G06F 16/258
See application file for complete search history.

(56) References Cited

U.S. PATENT DOCUMENTS

| | | | |
|---|---|---|---|
| 2011/0276610 A1* | 11/2011 | Hossain | G06F 16/289 707/813 |
| 2015/0213288 A1* | 7/2015 | Bilodeau | G06F 21/6254 726/26 |
| 2016/0321308 A1* | 11/2016 | Brinnand | G06F 16/215 |
| 2017/0003947 A1* | 1/2017 | Brooks | G06F 16/283 |
| 2018/0005330 A1* | 1/2018 | Williams | G09B 5/02 |
| 2020/0241991 A1* | 7/2020 | Patton | G06F 21/6254 |
| 2021/0067489 A1* | 3/2021 | Jayawardena | H04L 67/1097 |
| 2021/0133557 A1* | 5/2021 | Lyoob | G06F 40/205 |
| 2021/0327009 A1* | 10/2021 | Williams | G09B 5/00 |

* cited by examiner

*Primary Examiner* — Darshan I Dhruv
(74) *Attorney, Agent, or Firm* — Sheppard Mullin Richter & Hampton LLP

(57) ABSTRACT

A centralized data transformation system and corresponding methods/techniques define, select, and execute data transformation rules on data exported from disparate data sources within a source data environment to obtain scrubbed data, which can be imported into a target data environment in a manner that maintains referential integrity. The centralized data transformation system enables data portability between source and target environments, while ensuring compliance with limitations of the target environment. The centralized data transformation system applies scrubber rules consistently across related data fields of data objects of the same object type to ensure that the transformed data complies with limitations of the target environment pertaining to maintaining multiple copies of a given data set.

22 Claims, 12 Drawing Sheets

| Scrubber Jobs (671) | Scrubber Rules (6) | Object Metadata (593) | | | | |
|---|---|---|---|---|---|---|
| Search | | | | 706 | 708 — + Create Job | |
| Id | Target Environm... | Source Environment | Sou... | C... | Updated On | Execution Time | Status | Actions |
| 49196444-99... | Central Sandb... | Production US SLV... | d19... | s... | 10 hours ago | 3 minutes, 53 secon... | COMPLETED | |
| dbe8515d-17f... | Central Sandb... | Production US AW... | 3cd... | s... | 3 days ago | 1 minute, 2 seconds | COMPLETED | |
| 402893e1-46f... | Central Sandb... | Production US SLV... | 9a4... | s... | 3 days ago | 1 minute, 22 seconds | COMPLETED | |
| 8b1f0c79-e0a... | Central Sandb... | Production US AW... | 09... | a... | 4 days ago | 1 minute, 32 seconds | COMPLETED | |
| 21d294fb-c97... | Central Sandb... | Production US SLV... | adb... | s... | 4 days ago | 2 hours, 7 minutes | COMPLETED | |
| d4f1919a-d83... | Central Sandb... | Production US SLV... | adb... | g... | 5 days ago | 27 minutes, 47 seco... | CANCELLED | |
| 6d16340e-35b... | Central Sandb... | Production US SLV... | 8c8... | g... | 5 days ago | 4 minutes, 6 seconds | COMPLETED | |
| 28de7550-391... | Central Sandb... | Production US SLV... | a03... | g... | 5 days ago | 17 minutes, 54 seco... | COMPLETED | |
| 35655fdf-1725... | Central Sandb... | Production US SLV... | bac... | e... | 6 days ago | 2 minutes, 32 seconds | COMPLETED | |

FIG. 7

Scrubber Tasks

| Service Name | Object Name | Source Node | Target Node | Updated On | Execution Time | Status |
|---|---|---|---|---|---|---|
| transformer | ZbHierarchyT... | tout-auw2-c... | tout-auw2-c... | 1 week ago | 17 minutes, 2 seconds | COMPLETED |
| transformer | ZbCustomFie... | tout-auw2-c... | tout-auw2-c... | 1 week ago | 18 minutes, 15 seconds | COMPLETED |
| transformer | ZbCustomFie... | tout-auw2-c... | tout-auw2-c... | 1 week ago | 17 minutes, 2 seconds | COMPLETED |
| transformer | ZbCustomFie... | tout-auw2-c... | tout-auw2-c... | 1 week ago | 19 minutes, 3 seconds | COMPLETED |
| transformer | ZbHierarchy | tout-auw2-c... | tout-auw2-c... | 1 week ago | 19 minutes, 12 seconds | COMPLETED |

Scrubber Jobs (671) | Scrubber Rules (23) | Object Metadata (9)

1000

1002

Select a service ∨ | Input an object | | | + New | ⟳

| Service ⇅ | Object ⇅ | | Updated On ⇅ | Action |
|---|---|---|---|---|
| | | Edit Object Metadata | | |
| | | Service | | |
| | | genesis | | |
| genesis | Attribute | Object | ema:com:zuora... | 2 months ago |
| genesis | Entity | Entity | ema:com:zuora... | 2 months ago |
| | | Schema Type | | |
| genesis | Policy | OBJECT ⟩ | ema:com:amazo... | 2 months ago |
| | | Schema | | |
| genesis | Role | "type":"string" | ema:com:zuora... | 2 months ago |
| | | }, | | |
| genesis | SecurityPo | "tenantId":{ | ema:com:zuora... | 2 months ago |
| | | "type":"string" | | |
| genesis | Tenant | }, | ema:com:zuora... | 2 months ago |
| | | "attributeIds":{ | | |
| genesis | User | "type":"array", | ema:com:zuora... | 2 months ago |
| genesis | UserProfile | Upload Schema... | ⬆ Drop file here | |
| genesis | Whitelist | Save | Cancel | |

FIG. 11

CENTRALIZED DATA TRANSFORMATION IN A MULTI-TENANT COMPUTING ENVIRONMENT

CROSS REFERENCE TO RELATED APPLICATION

This application claims the benefit of U.S. Provisional Application Ser. No. 63/316,365, entitled "Centralized Data Transformation In A Multi-Tenant Computing Environment," filed on Mar. 3, 2022, which is incorporated by reference in its entirety herein.

TECHNICAL FIELD

This disclosure pertains to multi-tenant computing environments, and more particularly to centralized data transformation to enable data portability and data integrity between different data environments in a multi-tenant computing system.

BACKGROUND

A multi-tenant computing environment may provide cloud-based software-as-a-service (SaaS) services to multiple tenants, who may include, for example, service entities that provide services to end users on a subscription basis. The SaaS services provided by the multi-tenant computing environment may include billing services, data storage services, or the like that tenants can leverage in connection with their subscription-based service offerings. The multi-tenant computing environment may include a multi-tenant computing system that includes various types of shared resources for hosting the SaaS services. Tenant data, which may include, for example, subscriber billing/payment data, subscriber account profile data, and the like, may be stored across multiple data stores. In some cases, data for a given tenant may be distributed across multiple data stores and/or data environments.

SUMMARY

A centralized data transformation system and corresponding methods/techniques are disclosed for defining, selecting, and executing data transformation rules on data exported from disparate data sources within a source data environment to obtain scrubbed data, which can then be imported into a target data environment in a manner that maintains referential integrity. The centralized data transformation system enables data portability between source and target environments, while ensuring compliance with limitations of the target environment. Moreover, the centralized data transformation system applies scrubber rules consistently across related data fields of data objects of the same object type to ensure that the transformed data complies with limitations of the target environment pertaining to maintaining multiple copies of a given data set.

In some embodiments, the centralized data transformation system may provide/support/host a scrubbing service that applies a set of scrubber rules to tenant data exported from a source environment to obtain transformed tenant data (i.e., scrubbed data) that can then be imported into a target environment. In some embodiments, the tenant data may be exported from the source environment to a data repository to which the scrubbing service and the target environment have shared access. In some embodiments, the exported tenant data may include data retrieved from a monolithic data source or disparate data sources. Prior to export to the shared data repository, an exporter component that sits in the source environment or elsewhere may normalize any disparate tenant data to generate normalized tenant data having a uniform data format that the scrubbing service is able to interpret and act upon. As with the source environment, when the scrubbed tenant data is imported into the target environment, it may, in some embodiments, be stored across multiple data stores, each with its own native data format. As such, prior to importing the scrubbed tenant data into the target environment, a data importer component that sits in the target environment or elsewhere may convert respective portions of the scrubbed tenant data—which may be in a normalized data format—to corresponding native file formats of the various data stores in which the scrubbed tenant data portions are to be stored.

In an example embodiment, a method of scrubbing tenant data in a multi-tenant computing environment is disclosed. The method includes accessing tenant data exported from a source data environment, the tenant data being in a normalized data format; identifying at least a subset of the tenant data associated with a particular data object type; identifying a set of scrubber rules associated with the particular data object type, each scrubber rule being configured to apply a respective predefined transformation to an input value of a data object of the particular data object type to obtain a corresponding scrubbed value; applying the set of scrubber rules to the at least a subset of the tenant data to obtain scrubbed tenant data; and facilitating importing of the scrubbed tenant data into a target data environment.

In an example embodiment, accessing the tenant data includes accessing a data repository to which the tenant data is exported in the normalized data format, and facilitating importing of the scrubbed tenant data includes making the scrubbed tenant data available to the target data environment by storing the scrubbed tenant data in the data repository in the normalized data format.

In an example embodiment, the tenant data is converted from a first native data format associated with the source data environment to the normalized data format prior to being exported to the data repository.

In an example embodiment, the scrubbed tenant data is converted from the normalized data format to a second native data format associated with the target data environment prior to importing the scrubbed tenant data into the target environment.

In an example embodiment, the method further includes applying a respective additional set of scrubber rules to each of one or more additional subsets of the tenant data to obtain additional scrubbed tenant data, each additional subset of the tenant data being associated with a respective corresponding additional data object type, and facilitating importing of the additional scrubbed tenant data into the target data environment.

In an example embodiment, the tenant data is associated with a particular tenant of a plurality of tenants in the multi-tenant computing environment, an existing copy of the tenant data is maintained in the target data environment, and the scrubbed tenant data is an additional copy of the tenant data that is imported into the target data environment.

In an example embodiment, the respective predefined transformation of a first rule in the set of scrubber rules includes rewriting an object identifier in the tenant data to obtain a rewritten object identifier in the scrubbed tenant data.

In an example embodiment, the rewritten object identifier maintains, at least in part, a referential integrity of the scrubbed tenant data after it is imported as the second copy of the tenant data into the target data environment.

In an example embodiment, each scrubber rule in the set of scrubber rules includes a file path for an object field to be scrubbed, an identifier of a scrubber, and a scrubber parameter comprising an input value to be transformed by the scrubber.

In an example embodiment, a first scrubber rule in the set of scrubber rules further includes a filter, and applying the set of scrubber rules to the at least a subset of the tenant data includes conditionally applying the first scrubber rule to a set of data objects in the at least a subset of the tenant data.

In an example embodiment, conditionally applying the first scrubber rule to the set of data objects includes, for each data object, determining, based on the filter, whether the first scrubber rule is applicable to the data object, and if it is determined that the first scrubber rule is applicable to the data object, applying the respective predefined transformation of the first scrubber rule to an input value contained in the object field to be scrubbed in the data object to obtain a corresponding scrubbed data object having a scrubbed value in the object field.

In an example embodiment, the set of scrubber rules is applied to the at least a subset of the tenant data as the tenant data is being replicated from the source environment to the target data environment.

In an embodiment, one or more operations of any of the above-described methods of scrubbing tenant data in a multi-tenant computing environment may be performed by a centralized data transformation system that is located remotely from the source data environment and the target data environment.

In an example embodiment, a system for scrubbing tenant data in a multi-tenant computing environment is disclosed. The system includes at least one memory storing computer-executable instructions and at least one processor configured to access the at least one memory and execute the computer-executable instructions to perform a set of operations. The operations include accessing tenant data exported from a source data environment, the tenant data being in a normalized data format; identifying at least a subset of the tenant data associated with a particular data object type; identifying a set of scrubber rules associated with the particular data object type, each scrubber rule being configured to apply a respective predefined transformation to an input value of a data object of the particular data object type to obtain a corresponding scrubbed value; applying the set of scrubber rules to the at least a subset of the tenant data to obtain scrubbed tenant data; and facilitating importing of the scrubbed tenant data into a target data environment.

In an example embodiment, a computer program product for scrubbing tenant data in a multi-tenant computing environment is disclosed. The computer program product includes a non-transitory computer-readable medium readable by a processing circuit. The non-transitory computer-readable medium stores instructions executable by the processing circuit to cause a method to be performed. The method includes accessing tenant data exported from a source data environment, the tenant data being in a normalized data format; identifying at least a subset of the tenant data associated with a particular data object type; identifying a set of scrubber rules associated with the particular data object type, each scrubber rule being configured to apply a respective predefined transformation to an input value of a data object of the particular data object type to obtain a corresponding scrubbed value; applying the set of scrubber rules to the at least a subset of the tenant data to obtain scrubbed tenant data; and facilitating importing of the scrubbed tenant data into a target data environment.

Any of the above-described method, system, and/or computer program product embodiments can be combined in any manner to obtain additional embodiments of the disclosed technology. In particular, any feature, component, aspect, or the like of a given embodiment can be combined with any other feature, component, aspect, or the like of any other embodiment to obtain another embodiment of the disclosed technology.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the disclosed technology are set forth with particularity in the appended claims. A better understanding of the features and advantages of the disclosed technology will be obtained by reference to the following detailed description that sets forth illustrative embodiments, in which the principles of the technology are utilized, and the accompanying drawings of which:

FIG. 7 depicts an example user interface for viewing and creating scrubber jobs in accordance with embodiments of the disclosed technology.

FIG. 8 depicts an example user interface for viewing scrubber tasks contained within a selected scrubber job in accordance with embodiments of the disclosed technology.

FIG. 10 depicts an example user interface for editing metadata of objects to be scrubbed in accordance with embodiments of the disclosed technology.

FIG. 11 depicts an example user interface for defining a scrubber rule in accordance with embodiments of the disclosed technology.

DETAILED DESCRIPTION

Figure 1:
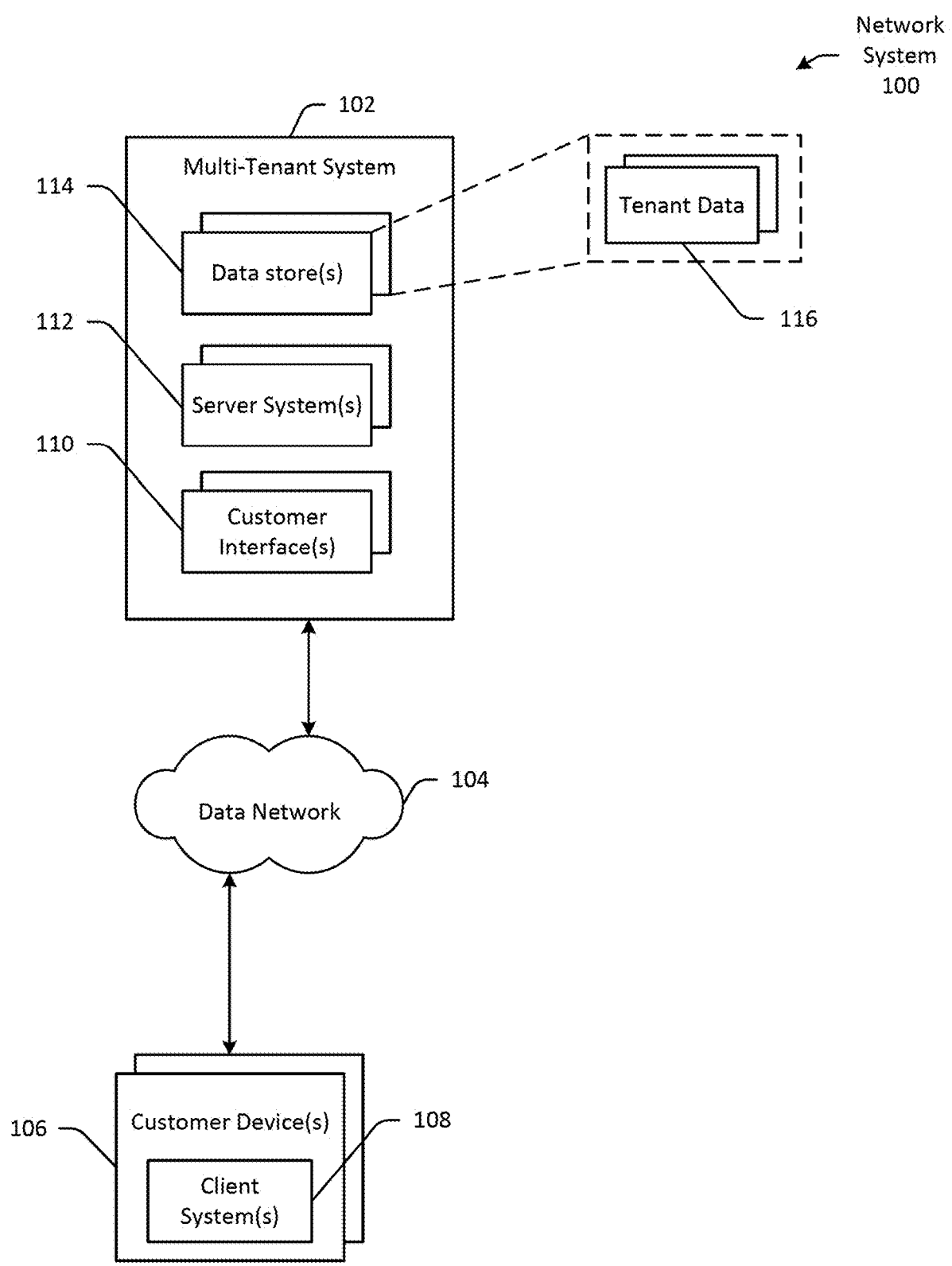
FIG. 1 is a block diagram depicting an example network system that includes a multi-tenant system configured to provide cloud-based software-as-a-service (SaaS) services to multiple tenants in accordance with embodiments of the disclosed technology.

A multi-tenant computing environment may include a multi-tenant computing system that includes various hardware and software resources configured to provide software-as-a-service (SaaS) SaaS services to multiple tenants. Such SaaS services may be provided within a microservices-based architecture according to which each service may be structured as a microservice configured to utilize/communicate with other microservices via corresponding service provider interfaces (SPIs). Data may be exchanged between microservices via their corresponding SPIs. In some cases, microservices may communicate data among one another using a commonly understood data format; however, any given microservice may handle data locally in one or more native data formats.

The multi-tenant computing environment may store respective tenant data for each of the multiple tenants that it services. Tenant data for a given tenant—which may include, without limitation, subscriber billing/payment data, subscriber account profile data, or the like—may be stored across multiple data stores and/or within multiple data environments. As such, tenant data relating to a given tenant may be viewed as a logical grouping of disparate but interrelated data across multiple services. Microservices may choose to store tenant data differently. For instance, a service may store a tenant's data in the same table structures as another tenant's data. Alternatively, a service may maintain a separate schema for each tenant, or perhaps even a separate schema per entity.

At times, tenant data may be moved between different data environments. Migrating tenant data between different data environments may include making and storing multiple copies of a same tenant's data. For example, a tenant may request a sanitized version of a production copy of its data with personally identifying information (PII) redacted. In response, the multi-tenant computing system may generate the sanitized copy of the tenant's production data and store it in a target environment to which the tenant has access. As another non-limiting example, multiple copies of a given tenant's production data may be made for sales-related purposes.

Ensuring that tenant data remains portable and that data integrity is maintained as the data transitions between different data environments over the course of its lifecycle is a priority. In particular, it is desirable for tenant data, which may be retrieved from disparate data sources and potentially stored in different data formats that are native to those data sources, to maintain its referential integrity when the data is migrated to a target data environment. Referential integrity may refer to a property of data in which all references between data elements are valid. In the context of relational databases, referential integrity states that if a value of one attribute (e.g., column) of a relation (e.g., table) references a value of another attribute (either in the same or a different relation), then the referenced value must exist. For referential integrity to hold in a relational database, any column in a base table that is declared a foreign key should contain only NULL values or values from a parent table's primary key or a candidate key. A foreign key may be an attribute value(s) that serves as the primary key (or a candidate key) in another table. A candidate key may be one or more attributes (e.g., columns) of a relation (e.g., table) that uniquely identify a tuple (e.g., row) in the relation. In some cases, a candidate key may be a minimal set of attribute(s) that uniquely identify a tuple, i.e., a candidate key may contain no redundant attributes. A primary key may itself be a candidate key. Stated another way, for referential integrity to be maintained, when a foreign key value is used in a table, it must reference a valid, existing primary key in the parent table. For example, deleting a value referred to by a foreign key in another table would break referential integrity.

In some cases, when importing a copy of tenant data into a target environment, an existing copy of the tenant data may already be present in the target environment. The tenant data may include various universally unique identifiers (UUIDs) such as a tenant ID, entity IDs, and the like. One or more of these UUIDs may be a primary key in a table which may, in turn, be referenced by a foreign key in another table. Because a primary key is a UUID, it may need to be changed to a different value in the imported copy of the tenant data from its value in the existing copy of the tenant data. Doing so, however, may result in referential integrity of the imported copy of the tenant data becoming broken if the change to the primary key is not propagated to all references to the primary key in the imported copy of the tenant data. That is, there may be ambiguity as to whether data elements in the newly imported copy of the tenant data reference other data elements in the imported copy (as expected if referential integrity is maintained) or data elements in the existing copy of the tenant data. Moreover, in some scenarios, the target environment may be limited in that it may only be able to support a single identical copy of a given data set. Accordingly, consistent data transformations may need to be applied across related data fields to enable multiple copies of tenant data for a same tenant to be stored in a target environment. It should be appreciated that reference herein to migrating/moving/porting data from a source data environment to a target data environment may include copying the data to the target environment while still retaining the data in the source data environment, or alternatively, replicating the data in the target environment and removing the data from the source environment. Either of these scenarios may be viewed as a data copying operation.

Existing approaches for managing data portability between multiple data environments suffer from a number of technical drawbacks, particularly with respect to multi-tenant computing environments. Such approaches generally target data stored in specific data stores in specific data formats, and are incapable, for example, of aggregating tenant data for a given tenant across multiple disparate data sources in one or more source environments and creating multiple copies of the aggregated tenant data in a given target environment in a manner that ensures that desired data transformations are consistently applied across related data fields and that data integrity is maintained.

Embodiments of the disclosed technology provide a technical solution that addresses the technical drawbacks noted above for existing data portability/data transformation approaches. In particular, embodiments of the disclosed technology provide a centralized data transformation system and corresponding methods/techniques of operation of the system to define, select, and execute data transformation rules (also referred to herein as scrubber rules) on data exported from disparate data sources within a source data environment, such that when the scrubbed data is imported into a target environment, referential integrity of the data is maintained. Moreover, the centralized data transformation system disclosed herein enables data portability between a source environment and a target environment, while at the same time, ensuring compliance with limitations of the target environment such as a limitation on the number of copies of the same data set that can be maintained in the target environment. For instance, the centralized data transformation system is configured to apply scrubber rules consistently across related data fields of data objects of the same object type to ensure that the transformed data complies with limitations of the target environment pertaining to maintaining multiple copies of a given data set.

In some embodiments, the centralized data transformation system may provide/support/host a scrubbing service that applies a set of scrubber rules to tenant data exported from a source environment to obtain transformed tenant data (i.e., scrubbed data) that can then be imported into a target environment. In some embodiments, the tenant data may be exported from the source environment to a data repository to which the scrubbing service and the target environment have shared access. In some embodiments, the exported tenant data may include data retrieved from disparate data sources. For instance, the exported tenant data may include data from any number of services, which in turn, may be backed by any number of data stores. The data from different data stores may be stored in different file formats that are native to the data stores.

Prior to export to the shared data repository, an exporter component that sits in the source environment or elsewhere may normalize the disparate tenant data to generate normalized tenant data having a uniform data format that the scrubbing service is able to interpret and act upon. The scrubbing service may execute scrubber rules (and their corresponding data transformations) on the normalized exported tenant data to generate a processed version of the data—referred to herein as scrubbed tenant data—which may be stored in the shared data repository. The scrubbed tenant data may have the same normalized data format as the normalized exported tenant data from which it is generated. As with the source environment, when the scrubbed tenant data is imported into the target environment, it may ultimately be stored across multiple data stores, each with its own native data format. As such, prior to importing the scrubbed tenant data into the target environment, a data importer component that sits in the target environment or elsewhere may convert respective portions of the scrubbed tenant data—which are in the common/normalized data format—to corresponding native file formats of the various data stores in which the scrubbed tenant data portions will be stored.

In some embodiments, the normalized tenant data may include data objects of various data object types. A data object may include any discrete data element associated with a data schema, and may be representative, for example, of an entity modeled by the data schema. In the case of a multi-tenant computing system, a data object type may include, for example, a tenant, a subscriber of the tenant, a billing account of a subscriber of the tenant, a service subscription associated with the billing account, or the like. In some embodiments, the normalized tenant data may include hierarchical data in the form of parent data objects and child data objects that depend from the parent data objects via corresponding parent-child dependencies. A parent data object may itself may be child data object to one or more other parent data objects. For instance, a billing account data object may be a parent data object to each of an invoice child data object and a subscription child data object. The invoice data object may, in turn, be a parent data object to an invoice item child data object.

In some embodiments, scrubber rules may be tailored to particular data object types. More specifically, a respective set of data scrubber rules may be defined and applied to all data objects of a given data object type. In some embodiments, a scrubber rule may be applied to/evaluated against each processable entity of the normalized exported tenant data. In some embodiments, the normalized data format to which the tenant data is converted may be the JavaScript Object Notation (JSON) data format, in which case, a processable entity may be a JSON object contained in a JSON file. JSON is an open standard file format and data interchange format that uses human-readable text to store and transmit data objects.

In some embodiments, after conversion, the exported tenant data may include a collection of JSON line files having the extension .jsonl. Each such JSON line file may include a series of JSON lines, where each line represents a distinct processable entity, e.g., a JSON data object. In some embodiments, each JSON line file may include JSON data objects (i.e., JSON lines) that correspond to the same JSON data object type. For each JSON line file, a corresponding set of scrubber rules may be identified and applied to a respective object instance extracted from each JSON line. The set of scrubber rules applied to JSON lines of a given JSON line file may be those that are specifically tailored to perform data transformations on data objects of the particular data object type represented in that JSON line file. In some embodiments, the normalized exported tenant data may include a JSON file in which each line does not necessarily represent a distinct data object (e.g., multiple lines in the JSON file may constitute a single JSON object). However, even if each JSON line does not constitute a distinct data object, each JSON line may nonetheless be a processable entity capable of being acted upon by a scrubber rule. It should be appreciated that JSON is merely an example standardized file format that can be used. Another example format is the comma separated value (csv) file format.

In some embodiments, a given scrubber rule may be applicable to multiple data object types such as a scrubber rule that transforms UUIDs in a consistent manner (e.g., by appending a predefined string to each UUID). As described in more detail later in this disclosure, such a scrubber rule may be applied universally to tenant data across all data object types to ensure referential integrity of the data is maintained after it is imported into a target environment and/or to ensure compliance with data storage limitations of the target environment such as limits on the number of identical copies of tenant data for the same tenant that can be stored.

In some embodiments, the scrubbing service may be configured to provide conditional scrubbing functionality. For example, a scrubber rule may be a conditional scrubber rule that includes a filter such as a Boolean expression that is evaluated against each processable entity of the normalized tenant data to determine whether the scrubber rule is applicable to the processable entity. The scrubber rule may then be applied to only those processable entities for which the Boolean expression evaluates to a desired Boolean value, either a TRUE or a FALSE value. This may also be referred to herein as conditional application of a scrubber rule.

Assume, for example, that a conditional scrubber rule is applied to each line of a JSON line file. In some example scenarios, the Boolean expression may output a TRUE result if a JSON line includes one or more specific values in one or more data fields, and the scrubber rule may only be applied to those JSON lines for which the Boolean expression evaluates to FALSE (i.e., those data objects that do not contain the one or more specific values in the one or more data fields). In other example scenarios, the scrubber rule may be applied to only those JSON file lines that do include one or more specific values in one or more data fields, i.e., those JSON lines for which the Boolean expression returns a TRUE result.

The centralized data transformation system and corresponding scrubbing service it provides according to embodiments of the disclosed technology yield a number of technical improvements over existing data transformation/data portability approaches. As noted earlier, the centralized data transformation system is configured to transform data from any number of disparate data sources in a source environment in a manner that ensures that referential integrity of the data is maintained when it is imported into a target environment. Within a microservices-based architecture, for example, the centralized data transformation system is not limited to operating against a specific service's data set, but can consume data from any number of services, backed by any number of types of data stores with their own native file formats (e.g., RDBMS, NoSQL, file systems, etc.) as long as the data is first normalized to a uniform data format. This yields the technical improvement of decoupling implementation of the centralized data transformation system and its scrubbing service from the underlying physical structure of the respective services' data stores.

Moreover, the centralized data transformation system disclosed herein enables data portability between a source environment and a target environment, while at the same time, ensuring compliance with requirements of the target environment such as a limitation on the number of copies of the same data set that can be maintained in the target environment. For instance, the centralized data transformation system is configured to apply scrubber rules consistently across related data fields of data objects of the same object type to ensure that the transformed data complies with limitations of the target environment pertaining to maintaining multiple copies of a given data set.

Additional technical improvements stem from the structure and design of the centralized data transformation system and the corresponding scrubbing service disclosed herein. In particular, because the centralized data transformation system can operate on any amount of disparate data from any number of disparate data sources as long as the data is converted to a standardized data format, and outputs scrubbed data in the same standardized format, the system is highly scalable, pluggable, and extensible. For instance, the scrubbing service provided by the centralized data transformation system can run as a standalone service without any dependencies on other services. These capabilities to scrub data extracted from any type of data storage (as long as it is inputted to the scrubbing service in a normalized data format) and to operate as a standalone service without dependencies, enable the centralized data transformation system/scrubbing service to be easily integrated as a standalone general data/object transformer into any of a variety of different ETL systems that use an intermediate data format such as JSON lines when moving data between different data environments. In particular, the centralized data transformation system/scrubbing service disclosed herein can be deployed in any ETL system as long as its upstream service generates normalized input data for the scrubbing service (e.g., JSON line files) and its downstream service consumes data in the same normalized data format.

The centralized data transformation system and its scrubbing service disclosed herein provide still more technical improvements over existing data transformation/data portability approaches. For instance, the centralized data transformation system according to embodiments of the disclosed technology is able to process complex data objects and data structures such as high-level business objects (e.g., invoices). This capability to process complex data objects/shapes stems, at least in part, from the ability to flexibly define any number of scrubber rules that can perform a variety of different types of data transformations, including different transformations for different data fields of the same type of data object.

Such data transformations may include, without limitation, deleting an entire data field value, deleting/redacting a portion of a data field value, performing another type of fixed transformation on a data field value (e.g., appending a fixed character string as a prefix or postfix to a data field value, incrementing/decrementing the data field value by a fixed value, etc.). For example, a set of scrubber rules may be defined to remove/redact PII from tenant data—where such PII may be present in any number of data fields of a data object—in order to produce a sanitized copy of the tenant data. The data transformations that scrubber rules may perform on data objects are not limited to scrubbing PII data, but as noted earlier, may include other transformations such as rewriting UUIDs (e.g., tenant IDs, entity IDs, foreign keys, etc.) in a referentially consistent manner in connection storing multiple copies of tenant data in a target environment.

This capability to define scrubber rules that implement complex scrubbing algorithms and to dynamically extend the system to support any number of additional scrubber rules is lacking in existing approaches. The capability to define scrubber rules that implement complex scrubbing algorithms includes, for example, the capability to define conditional scrubber rules, which existing approaches do not support. Because existing approaches do not support conditional scrubbing, they are unable to scrub dynamic data such as custom objects, for example. Custom objects are usually implemented using a general table with common fields. These fields may be used to store different data for different tenants in a multi-tenant environment. Because the centralized scrubbing service and system disclosed herein allows for conditional scrubber rules to be defined, it is able to selectively scrub tenant data for a particular tenant even if that tenant data is stored in a custom data object with tenant data for other tenants.

As will be described in more detail later in this disclosure, the scrubber rules can be created and managed directly through YAML configuration files (or files written in other data-serialization languages) and/or through application programming interfaces (APIs) such as RESTful APIs. In some embodiments, APIs can be utilized to dynamically update the scrubbing service in real-time to address, for example, changing data shapes and/or to support transformation of a normalized data set from one structural shape to another. This constitutes another technical improvement over existing approaches.

In embodiments of the disclosed technology, the centralized data transformation system and scrubbing service serves a single processing choke point for all data transitioning between different environments. That is, in some embodiments, any data that is exported from any source environment passes through the centralized data transformation system prior to being consumed by a downstream service (e.g., imported into a target environment). This results in yet another technical improvement over existing data transformation/data portability approaches. In particular, because all data transitioning between different data environments passes thorough the scrubbing service, tenant data can be processed holistically as a composite entity without concern for the underlying implementation details of the various services from which the data is exported. Such underlying implementation details may include a native file format in which a service stores tenant data, a data storage type/structure/schema that a service uses to store tenant data, or the like.

Additional technical advantages of embodiments of the disclosed technology include the capability to compile scrubber rules as binaries and execute the scrubber rules as native machine code, which enhances performance of the rule execution; the capability to instantiate multiple scrubber executors/modules and dynamically schedule them in different ways to improve the efficiency with which the scrubber rules are executed (described in more detail later in this disclosure); secure storage of intermediate data (e.g., normalized exported tenant data, scrubbed data, etc.) in a data repository that is external to both the source and the target environments, but which is accessible by both environments; and capability to deploy the scrubbing service in a cloud environment that enables more efficient scaling for very large data volumes.

An overview of various embodiments of the disclosed technology has been presented above. A more detailed discussion of these and other embodiments of the disclosed technology will now be provided. It should be appreciated the embodiments individually described herein can be combined in any manner to yield additional embodiments of the disclosed technology. It should further be appreciated that discussion herein of one or more aspects of any particular embodiment shall not be construed as an admission that such aspect(s) are not also shared by other embodiments of the disclosed technology.

FIG. 1 depicts a diagram of an example network system 100 for providing cloud-based SaaS services of a multi-tenant system 102 to multiple tenants according to embodiments. Examples of such cloud-based SaaS services include data storage services, data processing services, and business-oriented application services. In some embodiments, each tenant may be a subscription-based entity or provider such as an internet service provider, a home security system and service provider, a cellular phone service provider, an entertainment content provider, or the like. A respective group of one or more users (e.g., individuals, business entities, customers of the business entities, systems, etc.) may share access to the cloud-based services provided to each tenant by the multi-tenant system 102. In some embodiments, a tenant corresponds to a service entity such as AT&T™, Netflix™, Verizon™, or the like, and includes one or more products or services offered by an entity. For example, in an example embodiment, AT&T internet products and AT&T security products may be separate and distinct tenants. In some embodiments, the cloud-based SaaS services relate to managing subscriber records, product and/or service consumption information, billing information, payment information, or the like.

The network system 100 includes the multi-tenant system 102 coupled via a data network 104 (e.g., a set of one or more public and/or private, wired and/or wireless networks) to client/customer devices 106. The multi-tenant system 102 includes shared resources for hosting the cloud-based SaaS services provided to the tenants. The shared resources may include processors, memory, virtual systems, services, application programs, load balancers, firewalls, and so forth. As depicted in FIG. 1, the multi-tenant system 102 may include tenant/customer interfaces 110, server systems 112, and data stores 114. Each of the client devices 106 may include a client system 108 that accesses the cloud-based SaaS services hosted by the multi-tenant system 102. In some embodiments, the client systems 108 may be operated by employees (e.g., administrator users) of the provider of the multi-tenant system 102; by employees of the tenants; and/or by end users of the tenants' services.

Each client device 106 may include a personal computing device such as a desktop computer, a laptop computer, a notebook, a tablet, a personal digital assistant (PDA), a smartphone, a wearable computing device, and/or any other consumer electronic device incorporating one or more computer components. The client system 108 on each client device 106 may include hardware, software, and/or firmware for communicating with the multi-tenant system 102 and accessing the cloud-based services hosted by the multi-tenant system 102. Examples of the client systems 108 may include, without limitation, web browsers, client engines, drivers, user interface components, proprietary interfaces, and so forth.

The multi-tenant system 102 may include hardware, software, and/or firmware for hosting cloud-based services for tenants. In embodiments, the multi-tenant system 102 may offer access to shared resources including systems and applications on shared devices and may offer each tenant the same quality of service or may offer different tenants varying qualities of service. In some embodiments, the multi-tenant system 102 may not use virtualization or instantiation processes. In some embodiments, the multi-tenant system 102 may integrate several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a data store tier of multiple data stores 114 for the multiple tenants. In some embodiments, the tenant interfaces 110 may include graphical user interfaces and/or web-based interfaces to enable tenants (e.g., users acting on behalf of tenants) to access the shared services hosted by the multi-tenant system 102. The tenant interfaces 110 may support load balancing when multiple tenants (and/or multiple customers of the tenants) attempt to access the multi-tenant system 102 concurrently. The tenant interfaces 110 may additionally or alternatively include an operator interface for use by a systems operator to configure or otherwise manage configuration settings or the like for the multi-tenant system 102. In some embodiments, to support load balancing, each tenant may be associated with a subset of the total number of tenant interfaces 110.

In some embodiments, the server systems 112 may include hardware, software, and/or firmware configured to host the shared services for tenants. The hosted services may include tenant-specific business services or functions, including enterprise resource planning (ERP) services; customer relationship management (CRM) services; eCommerce services; Human Resources (HR) management services; financial services including, for example, payroll services, accounting services, subscription billing services, financial reporting and analysis services, or the like; calendaring services; order processing services; inventory management services; supply chain management (SCM) services; collaboration services; sales force automation (SFA) services; marketing automation services; support services including, for example, contact list management services, call-center support services, web-based customer support services, or the like; partner and vendor management services; product lifecycle management (PLM) services; and so forth. Similar to the tenant interfaces 110, in some embodiments, the server systems 112 may support load balancing when multiple tenants (and/or multiple customers of tenants) attempt to access the multi-tenant system 102 concurrently. Further, in some embodiments, each tenant may be associated with a subset of the total number of server systems 112 to support load balancing.

In some embodiments, tenant data 116 for each tenant may be stored in a logical store across one or more data stores 114. In some embodiments, each tenant uses a logical store that is not assigned to any predetermined data stores 114. Each logical store may contain tenant data 116 that is used, generated, and/or stored as part of providing tenant-specific business services or functions. In some embodiments, the data stores 114 may include RDBMS, object-based database systems, or the like. In some embodiments, tenant data 116 may be stored across multiple data stores 114, with each data store dedicated to a particular service (e.g., managing customer records, managing product and/or service consumption information, managing billing information, managing payment information, etc.).

In some embodiments, the tenant data 116 may include subscription information, such as billing data and/or subscription status data (e.g., active, canceled, suspended, re-activated). Billing data may include billing invoice data (e.g., date of invoices and invoice amounts, overage charge dates and overage charge amounts, etc.); payment transaction data (e.g., date of payments, amount of payments, etc.); payment plan data (e.g., annual billing, monthly billing, etc.); and/or service plan data (e.g., the name of a service plan). Subscription information may also include a geographic region and/or location information associated with a tenant, service, and/or subscriber. In some embodiments, the tenant data 116 may include usage data (e.g., account activity data), such as data identifying new subscriptions; changes to subscribed products and/or services; cancellation of one or more products and/or services; subscriptions to new products and/or services as part of an existing subscription; application of discounts; loyalty program package changes (e.g., additional programs and/or services, special rates, or the like for loyal customers); reduction or increase of rates for products and/or services; and/or cancellation of a subscription. In some embodiments, account activity data may include data indicative of subscriber product usage data (e.g., what channels the subscriber actually watches, what services and what level of consumption the subscriber receives, quality of the product and/or services, etc.). The tenant data 116 associated with a given tenant may include data at the tenant level such as subscription/product offering data, terms and conditions data, or the like that is generally applicable across subscribers of the tenant. The tenant data 116 associated with a given tenant may further include data at the individual subscriber/account holder level such as user profile/subscription data, user preference data, payment-related data (e.g., stored payment methods, billing history, etc.), and so forth.

In some embodiments, the tenant data 116 may be stored in one or more data formats according to one or more data schemas. For example, subscription tenant data may be stored in a particular format and usage tenant data may be stored in another format. As used herein, data formats, or simply formats, may include data types; variable types; file formats; protocols (e.g., protocols for accessing, storing, and/or transmitting data); programming languages; scripting languages; data value parameters (e.g., date formats, string lengths, etc.); endpoint locations; and so forth. In some embodiments, the tenant data 116 may be stored as data objects as part of an object-oriented data schema. The tenant data 116 may include parent data objects, where each parent data object is related to one or more child data objects via a parent-child dependency relationship. Any given parent data object may, in turn, be a child data object to one or more other parent data objects. Similarly, any given child data object may, in turn, be a parent data object to one or more other child data objects. In some embodiments, the tenant data 116 may include tabular data including one or more database tables and corresponding tabular data contained therein. Tabular data of the tenant data 116 may be linked to corresponding object data of the tenant data 116.

In some embodiments, the multi-tenant system 102 functions to provide uniform access to disparate services (e.g., microservices) and/or disparate data stores. For example, different services of the multi-tenant system 102 may manage (e.g., create, read, update, delete) tenant data 116 stored in different data stores 114. It will be appreciated that as used herein, a "service" may be single service and/or a set of services (e.g., a cluster of services). The data stores 114 may store data in different formats and/or the services may handle data differently. The services may each include a service provider interface (SPI) that provides data from the service and/or that receives data at the service in a common (or uniform) format, regardless of the original format that may be used by the service and/or data stores 114. This common format that services may use to communicate data among one another may be the same format or a different one from the intermediate data format to which data exported from a source environment is converted prior to scrubbing the data. In some embodiments, the multi-tenant system 102 may define a uniform access specification that defines the common format that the services must comport with when receiving and/or providing data. Accordingly, each of the services may be accessed in a uniform manner, and data may be consumed from the services in a uniform manner, regardless of the internal specifications and/or operations of the service.

The data/communication network 104 may represent one or more types of computer networks (e.g., a local area network (LAN), a wide area network (WAN), etc.) and/or underlying transmission media. The data network 104 may provide communication between the systems, engines, data stores, components, and/or devices described herein. In some embodiments, the data network 104 includes one or more computing devices, routers, cables, buses, and/or other network topologies (e.g., mesh network topologies). In some embodiments, the data network 104 may include one or more wired and/or wireless networks. In various embodiments, the data network 104 may include the Internet, one or more WANs, one or more LANs, and/or one or more other public, private, Internet Protocol (IP)-based, and/or non-IP-based networks.

Figure 2:
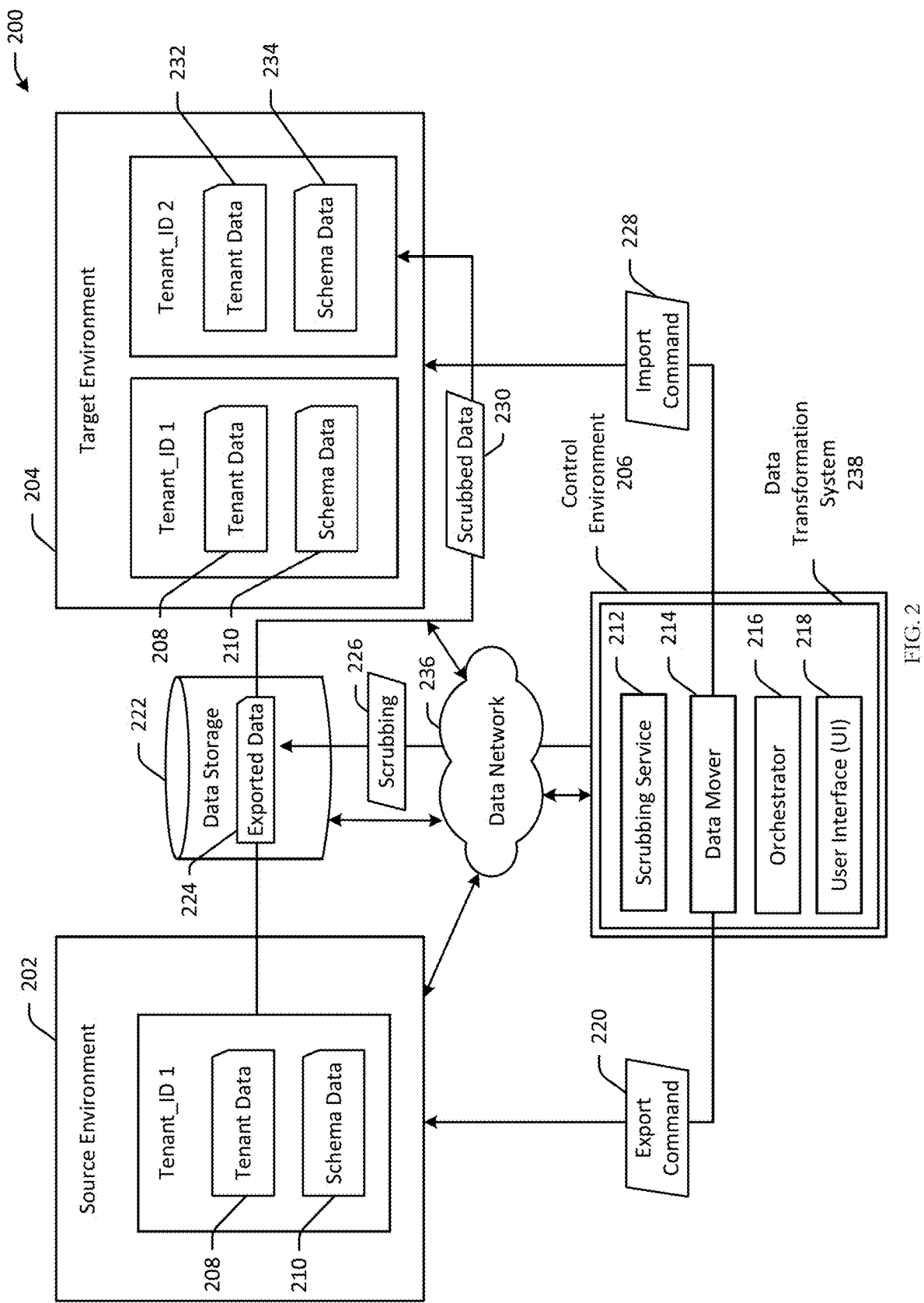
FIG. 2 is a block diagram depicting a system architecture for scrubbing data as it is replicated from a source environment to a target environment in accordance with embodiments of the disclosed technology.

FIG. 2 is a block diagram depicting a system architecture 200 for scrubbing data as it is replicated from a source environment 202 to a target environment 204 in accordance with embodiments of the disclosed technology. The source and target environments 202, 204 may be any suitable data environment. For example, in some embodiments, the source environment 202 may be a production tenant environment that houses live, production tenant data and the target environment 204 may be a test environment, a tenant's local environment, or the like. The architecture 200 may further include a control environment 206 configured to broker data movement between environments such as from the source environment 202 to the target environment 204. The architecture 200 may additionally include data storage 222. As described in more detail below, the data storage 222 may store exported data 224 from the source environment 202, scrubbed data 230, or the like.

In some embodiments, the source environment 202, the target environment 204, and the control environment 206 may be contained within the multi-tenant system 102, while data storage 222 may be external storage located outside of the multi-tenant system 102. In other embodiments, one or more both of the source and target environments 202, 204 may be remote from/external to the multi-tenant system 102. In some embodiments, the source environment 202, the target environment 204, and the control environment 206 may be communicatively linked via a data network 236, which may be a particular implementation of the data network 104 and may include any of the types of networks described in connection with data network 104. In some embodiments, each of the source environment 202, the target environment 204, and the control environment 206 may be located remotely from one another, and a computing system/device/component of one environment may communicate over one or more WANs with a computing system/device/component of another environment. For example, a data transformation system 238 in the control environment 206 may communicate with a data exporter (shown in FIG. 3) in the source environment 202 and a data importer (shown in FIG. 3) over one or more WANs. In some embodiments, the source and target environments 202, 204 may be linked via one or more LANs and the control environment 206 may be remote from the source and target environments 202, 204 but communicatively linked thereto via one or more WANs. In other embodiments, each of the source, target, and control environments, 202, 204, 206 may form part of the same LAN. In still other embodiments, each of the source, target, and control environments, 202, 204, 206 may reside on a same computing system or device, in which case, the data network 236 over which the environments communicate with one another may be a data communication bus.

The control environment 206 may include the data transformation system 238, which in turn, may include a rules-based scrubbing service 212, a data mover 214, an orchestrator 216, and a user interface (UI) 218. The data transformation system 238 may be a particular implementation of the multi-tenant system 102 or may be a sub-system (e.g., may be comprised of one or more of the server systems 112) of the multi-tenant system 102. It should be appreciated that exemplary components in the control environment 206 are depicted in FIG. 2 and that additional components may be present in the control environment 206. The orchestrator 216 may include hardware and/or software configured to initiate and manage data movement operations between environments. More specifically, the orchestrator 216 may be configured to create and manage test environments and initiate/schedule operations to, for example, copy tenant data from the source environment 202 to a test environment (e.g., the target environment 204), clone tenant data within the source environment 202, and/or refresh tenant data in the target environment 204. Data cloning and refreshing will be described in more detail later in this disclosure.

The UI 218 may be utilized, for example, by an admin user of the multi-tenant system 102 to access various functionality of the control environment 206, in particular, and the multi-tenant system 102, more generally. For instance, a user may access the UI 218 to define scrubber rules to be applied by the scrubbing service 212; trigger APIs of the orchestrator 216 to initiate/manage data copying operations, data cloning operations, data refresh operations, or the like; schedule application of scrubber rules by the scrubbing service 212 to perform data transformations associated with data copying, cloning, or refresh operations; and so forth. The UI 218 may, in practice, include a plurality of different user interfaces that individually or collectively provide access to varied functionality of components of the control environment 206 or of the multi-tenant system 102 more generally.

The control environment 206 may further include a data mover 214. The data mover 214 may include hardware and/or software configured to invoke operations for migrating (e.g., copying) tenant data from the source environment 202 to the target environment 204. In some embodiments, the orchestrator 216 may instruct the data mover 214 to initiate data migration operations. Further, in some embodiments, the data mover 214 sends an export command 220 to a data exporter service (not shown in FIG. 2) of the source environment 202, which in turn, may include a built-in service registry that identifies to the data exporter service which services it should trigger data operations on.

Data migration from the source environment 202 to the target environment 204 may occur for a variety of reasons. For instance, an admin user of the multi-tenant system 102 may wish to generate a copy of a given's tenant data within a test environment in order to debug the data to troubleshoot one or more issues. As another non-limiting example, a sanitized version of a tenant's data may be generated and copied to a local tenant environment or to an environment in the multi-tenant system 102 to which the tenant has exclusive access (as opposed to shared access among all tenants). In some scenarios, multiple copies of a given tenant's data may be migrated to the target environment 204. Each such copy may be accessed by a respective service in the target environment 204 or by users associated with a respective group/division/region of the tenant.

An illustrative tenant linked to tenant identifier Tenant_ID 1 is shown within the source environment 202. This tenant may be referred to hereinafter as Tenant 1 for ease of explanation. Although a single tenant is shown, it should be appreciated that the source environment 202 may include multiple tenants, each associated with a respective tenant identifier that is a UUID. Tenant data 208 associated with Tenant_ID 1 may be stored in the source environment 202, potentially across multiple data stores. The tenant data 208 may represent a portion of the tenant data 116 corresponding to a particular tenant. In some embodiments, each service provided by the multi-tenant system 102 may store at least a portion of the tenant data 208 in one or more data stores specific to that service. As previously noted, the tenant data 208 may be stored in different formats by different services, e.g., native file formats of the various data stores accessed by the services. The source environment 202 may further include schema data 210. The schema data 210 may include one or more data schemas defined for the tenant, one or more data schemas defined for one or more entities of the tenant (e.g., account holders), and so forth.

In some embodiments, the orchestrator 216 may instruct the data mover 214 to issue an export command 220 to initiate, for example, a data copy operation to copy the tenant data 208 for Tenant 1 from the source environment 202 to the target environment 204. As previously noted, the export command 220 may cause a data exporter service to retrieve the tenant data 208—which may be stored across multiple data stores in a multitude of different data formats—and normalize the tenant data 208. The data exporter service may store the normalized tenant data as exported data 224 in data storage 222. The orchestrator 216 may then control the scrubbing service 212 to initiate scrubbing operations 226 on the normalized exported data 224 to generate scrubbed data 230.

In some embodiments, the normalized exported data 224 may be a collection of JSON line files, where each JSON line file includes data objects of a same data object type. The scrubbing service 212 may identify a respective set of scrubber rules for each data object type and apply the rules to corresponding JSON line file(s) to obtain the scrubbed data 230. The scrubbed data 230 outputted by the scrubbing service 212 may also be in the JSON line format. As noted, a variety of different data transformations may be performed via application of the scrubber rules including, without limitation, removal/redaction of PII, rewriting/generating new globally unique identifiers (e.g., UUIDs), and so forth.

In some embodiments, after the exported data 224 has been scrubbed to produce the scrubbed data 230, the orchestrator 216 may instruct the data mover 214 to send an import command 228 to a data importer service (not shown in FIG. 2) of the target environment 204. The data importer service may include hardware and/or software configured to import the scrubbed data 230 into the target environment 204 as tenant data 232 and schema data 234. In a similar vein as the source environment 202, the tenant data 232/schema data 234 may be stored in the target environment 204 across multiple data stores, each potentially having its native data format. As such, the data importer service may be configured to convert the scrubbed data 230 from the normalized/standardized data format (e.g., JSON line format) to the respective individual formats associated with the various services and their respective data stores. While the scrubbed data 230 is shown as in-transit to the target environment 204, the scrubbed data 230 may be stored in the data storage 222 and the data importer service of the target environment 204 may retrieve the scrubbed data 230 from the data storage 222. More specifically, in some embodiments, the scrubbing service 212 may retrieve the normalized exported data 224 from the data storage 222, process the exported data 224 by applying scrubber rules to the data 224 to obtain the scrubbed data 230, and then store the scrubbed data 230 in the data storage 222. Thus, the data storage 222 may be shared data repository to which the data exporter service of the source environment 202, the scrubbing service 212, and the data importer service of the target environment 204 each have access.

In some embodiments, the target environment 204 may already include a copy of the tenant data 208 and schema data 210 for Tenant 1. Further, the target environment 204 may have a limitation on the number of copies of same tenant data set that can be concurrently stored in the target environment 204. To comply with such a limitation, the orchestrator 216 may instruct a provisioning service (not shown in FIG. 2) of the target environment 204 to provision a new tenant in the target environment 204. Provisioning a new tenant in the target environment 204 may include establishing, within the target environment 204, a schema for the new tenant and/or a schema for each entity of the new tenant such that when the scrubbed data 230 is imported into the target environment 204 as tenant data 230 and schema data 232, there are no collisions with the existing tenant data 208 and schema data 210. Further, the scrubber rules applied by the scrubbing service 212 to the exported data 224 may include data transformations to generate a new globally unique tenant identifier for the newly imported tenant data 230 (e.g., Tenant_ID 2), rewrite one or more UUIDs in the tenant data 208 to ensure compliance with data uniqueness requirements of the target environment 204, sanitize PII or other sensitive information form the tenant data 208, or the like. Further, the scrubbing service 212 may apply the scrubber rules and their associated data transformations consistently across related data fields of multiple data objects having potentially different data object types to ensure that referential integrity of the tenant data is maintained when it is imported as tenant data 230 and schema data 232 into the target environment 204. For instance, if the scrubbing service 212 applies a scrubber rule to a data object that involves a particular data transformation to a foreign key in a table, then the scrubbing service 212 is configured to uniformly apply the same data transformation to each other instance of that foreign key across one or more other data objects and each instance of the primary key referenced by that foreign key. In this manner, referential integrity of the imported data can be ensured.

Figure 3:
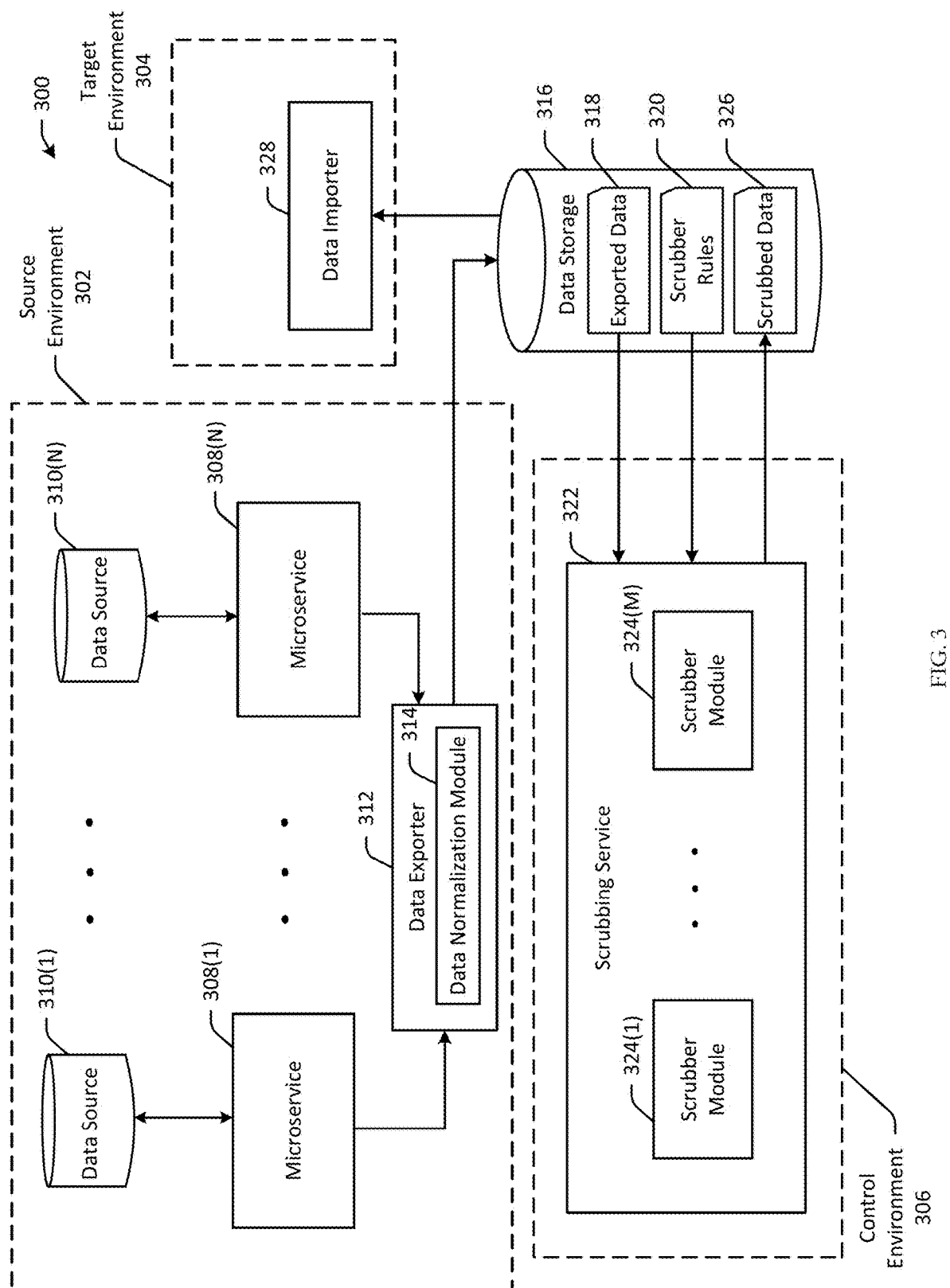
FIG. 3 is a block diagram depicting a more detailed system architecture implementation for scrubbing data exported from a source environment prior to importing the data into a target environment in accordance with embodiments of the disclosed technology.

FIG. 3 is a block diagram depicting a more detailed system architecture implementation 300 for scrubbing data exported from a source environment 302 prior to importing the data into a target environment 304 in accordance with embodiments of the disclosed technology. FIG. 3 depicts a source environment 302, a target environment 304, and a control environment 306 which may be particular example implementations of the source environment 202, target environment 204, and control environment 206 of FIG. 2, respectively. Similarly, the data storage 316 may be a particular example implementation of the data storage 222.

The source environment 302 may include a plurality of microservices 308(1)-308(N) (generically referred to herein as microservice 308), where N may be an integer greater than or equal to 2 (although a system with a single database is also possible). Each microservice 308 may include a corresponding SPI (not shown) via which it can communicate/share data with other microservices 308. Each microservice 308 may store tenant data for multiple tenants and may provide a specific type of functionality (e.g., billing functionality, payment functionality, account profile management functionality, subscription management functionality, etc.) with respect to the tenant data. In some embodiments, the microservices 308(1)-308(N) may be respectively associated with corresponding data sources 310(1)-310(N) (generically referred to herein as data source 310). While each microservice 308 is depicted as being associated with a single corresponding data source 310, it should be appreciated that a microservice 308 may access/store data in any number of associated data sources. In some embodiments, the data sources 310(1)-310(N) may be disparate data stores that store their respective data in different native data formats. While example embodiments are described herein in the context of a microservices-based architecture, the disclosed technology is not limited to this architecture. For instance, in some embodiments, the centralized data transformation system and corresponding scrubbing service can be implemented in a monolithic architecture.

The source environment 302 may further include a data exporter 312 that provides the data exporter service described earlier in reference to FIG. 2. The data exporter 312 may be configured to retrieve tenant data from the various disparate data sources 310(1)-310(N) via the corresponding microservices 308(1)-308(N). In some embodiments, the data retrieved from the various data sources 310(1)-310(N) may include may formatted according to multiple different data formats. The data exporter 312 may execute a data normalization module 314 to convert the disparate data to a common, uniform, standardized format such as JSON or JSON lines. Upon performing this conversion, the data exporter 312 may push the normalized data to external data storage 316 where it may be stored as exported data 318.

The control environment 306 includes a scrubbing service 322, which may be a specific implementation of the scrubbing service 212 of FIG. 2. Other components of the control environment 306 (such as those depicted in and described with respect to FIG. 2) are not shown in FIG. 3 for ease of explanation. In some embodiments, the scrubbing service 322 may be provided by a collection of one or more scrubber modules 324(1)-324(M) (referred to herein generically as scrubber module 324 or simply scrubber 324), where M may any positive integer value. In some embodiments, each scrubber module 324 may include modularized code registered as a spring bean. Each scrubber module 324 may implement a scrubber SPI. Addition of a new scrubber module 324 may be achieved by registering a new spring bean, which implements the scrubber SPI. The scrubber modules 324(1)-324(M) may include general scrubbers, such as JavaScrubber and ScriptScrubber, that allow a user to write on-site custom scrubbers in Java or a scripting language like JavaScript.

In some embodiments, the scrubbing service 322 may be configured to implement/apply/execute a set of scrubber rules 320 on the normalized exported data 318 using the scrubbers 324(1)-324(M) to obtain scrubbed data 326, which the scrubbing service 322 may store in the data storage 316. More specifically, each scrubber rule 320 may include an identifier of a scrubber 324 that—as part of application of the scrubber rule to a tenant data object—is instantiated and applied to the data object to perform one or more data transformations on one or more data fields of the data object. More generally, each scrubber 324 may be configured to accept a value, perform a fixed transformation over the value, and return a new value after the transformation. While the scrubber rules 320 are shown as being stored in same data storage 316 as the exported data 318 and the scrubbed data 326, the scrubber rules 320 may be stored elsewhere, e.g., in a data store within the control environment 306. In addition, in some embodiments, the data storage 316 may include a respective source bucket for each source environment and a respective target bucket for each target environment. As such, the data exporter 312 may export tenant data in the source environment 302 to the specific bucket in data storage 316 designated for source environment 302. The scrubbing service 322 may access the exported data 318 from this specific bucket, scrub the exported data 318 to obtain the scrubbed data 326, and then store the scrubbed data 326 is a specific target bucket designated for the target environment 304.

Just as the input to the scrubbing service 322 is in the normalized data format (e.g., JSON line files), so too is the scrubbed data 326 output. As such, prior to a data importer 328 of the target environment 304 importing the scrubbed data 326 into the target environment 304, the data importer 328 may first convert the scrubbed data 326 to the various native data formats of the various data sources employed by the microservices (not shown) of the target environment 304. Alternatively, each microservice in the target environment 304 may handle the conversion of the tenant data that it operates on prior to storing the converted data into a corresponding data source.

Figure 4:
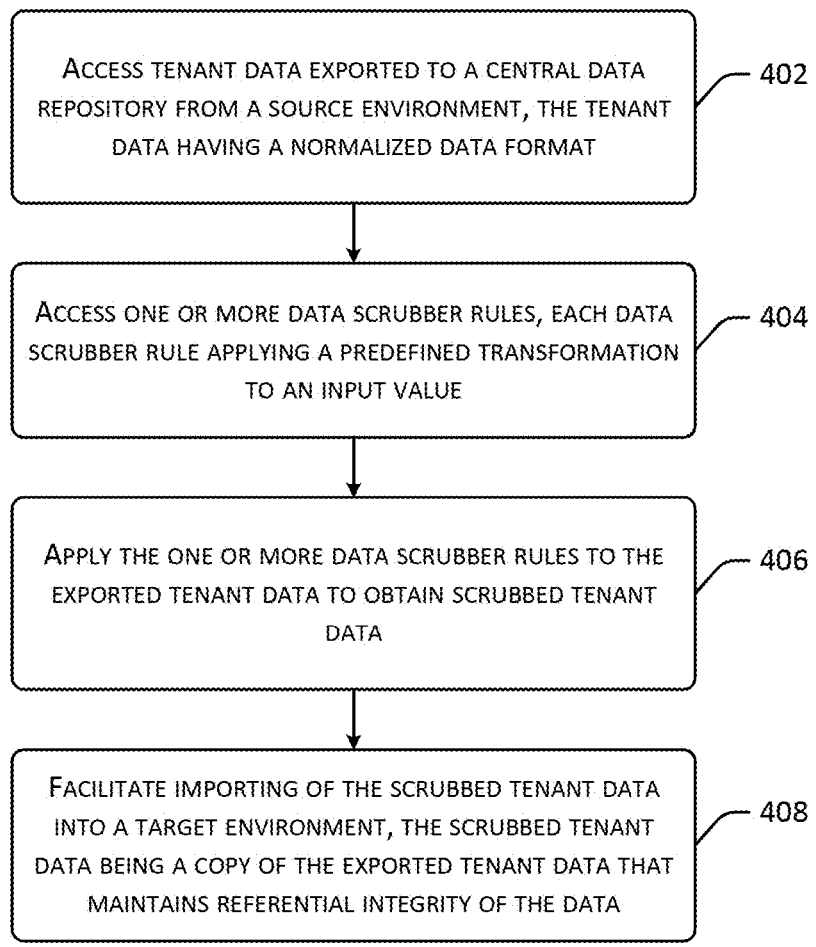
FIG. 4 is a flowchart of an illustrative method for performing data scrubbing in accordance with embodiments of the disclosed technology.

FIG. 4 is a flowchart of an illustrative method 400 for performing data scrubbing in accordance with embodiments of the disclosed technology. The method 400 will be described hereinafter in the context of the example system architecture 300 of FIG. 3. At block 402 of the method 400, the scrubbing service 322 may access tenant data exported to a central data repository (e.g., data storage 316). The exported tenant data 318 may be in a normalized format. For example, the exported data 318 may be a collection of JSON line files.

At block 404 of the method 400, the scrubbing service 322 may access one or more scrubber rules 320. Each scrubber rule 320 may apply a predefined data transformation to an input value to generate a transformed, i.e., scrubbed value. More specifically, in some embodiments, a scrubber rule may be a transformation applied to an object instance extracted from a JSON line that represents a distinct JSON data object. In some embodiments, each JSON line file may contain data objects of a single object type. For each object of a given object type, there may be multiple scrubber rules 320 to be applied to the object during runtime. More generally, the scrubber rules 320 may be applied to each processable entity of the normalized exported data 318. When the normalized exported data 318 are JSON line files, the scrubber rules 320 may be applied to each line of a JSON line file in the order in which the JSON lines are defined.

Figure 5:
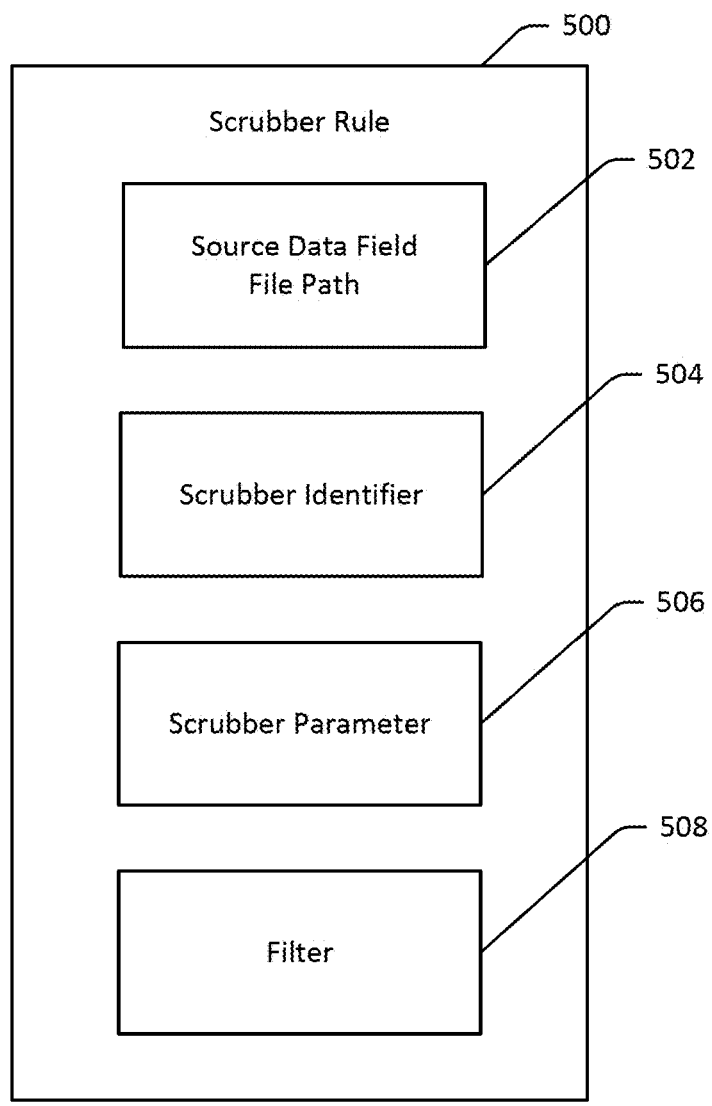
FIG. 5 is a block diagram depicting an example implementation of a data scrubber rule in accordance with embodiments of the disclosed technology.

FIG. 5 is a block diagram depicting an example implementation of a data scrubber rule 500 in accordance with embodiments of the disclosed technology. The example scrubber rule 500 includes a file path 502 for the field to be scrubbed; an identifier 504 (e.g., a name) of a scrubber 324 to be used to scrub the data during application of the scrubber rule 500; a parameter 506 to customize the scrubbing process; and, optionally, a filter 508. The file path 502 can be flexible, allowing for complex objects such as embedded objects, collection data, hierarchical data, or the like to be processed.

Assume there is an object with the following definition. The example definition below is written so as to elucidate the nested structure of the object. It should be appreciated, however, that the "person" object below may be represented within a single JSON line of a JSON line file.

```
{
  "age": 56,
  "name": {
    "firstName": "Mike",
    "lastName": "Jackson"
  },
  "children": [
    {
      "age": 12,
      "name": {
        "firstName": "Kate",
        "lastName": "Jackson"
      }
    },
    {
      "age": 23,
      "name": {
        "firstName": "Bill",
        "lastName": "Jackson"
      }
    }
  ]
}
```

The table below provides various example file paths for the example object definition above.

| path | Example | description |
|---|---|---|
| A single field name | Age | The person's age: 56 |
| A multiple-field path | name/firstName | The person's first name: "Mike" |
| An element of a collection | children/0 | The first child of this person: "Kate Jackson" |
| The wildcard of a collection | children/* | All the children of this person: "Kate Jackson" and "Bill Jackson" |
| Combination 1 | children/0/name/firstName | The first child's first name: "Kate" |
| Combination 2 | children/*/name/lastName | The last names of all the children: "Jackson" |

In some embodiments, wildcard file paths can be used to express all elements in a collection, in which case, a scrubber rule 320 that includes a wildcard file path may be applied to all fields specified by the wildcard path. While indices may be used to indicate a specific element in a collection— such as in the case of children/0 used to indicate the first child of the above-defined person object, i.e., "Kate Jackson"—an index number may cause an IndexOutOfBoundException if there is not at least one element in the collection at runtime, which is possible since the collection size varies during runtime.

Referring again to the example scrubber rule 500 of FIG. 5, the scrubber identifier 504 (e.g., scrubber name) may be indicative of the particular scrubber module 324 to be instantiated for use during application of the scrubber rule 500. More specifically, in some embodiments, each scrubber module 324 may extend an interface ScrubberFactory. The scrubber parameter 506 may be a value used by a particular scrubber module 324 to create a specific instance of the scrubber module 324, i.e., to instantiate a scrubber. In some embodiments, a scrubber is an object extending the interface Scrubber to generate a new value for a given input value. Illustrative definitions for the interfaces ScrubberFactory and Scrubber are shown below.

```
public interface ScrubberFactory<T> {
    Scrubber<T> create(String param);
}
public interface Scrubber<T> {
    T scrub(T value);
}
```

In some embodiments, a scrubber rule 500 may include a filter 508, which may be a Boolean expression written, for example, in Spring Expression Language (SpEL). The root of the Boolean expression may be an object instance deserialized from the current JSON line being evaluated. The filter 508 may be used to test if the scrubber rule is applicable to the current JSON line. If the scrubber rule does not specify a filter 508, the scrubber rule may be deemed applicable to all JSON lines in the file.

In some embodiments, the scrubbing service 322 may read the scrubber rules 320 from YAML files. An example YAML file specifying two scrubber rules for an "EmailTemplate" object is shown below. The beginning of the definition of a scrubber rule is identified with a dashed line.

```
EmailTemplate:
  - path: fromName
    name: substitute
    param: John Smith
    filter: fromType == 'ADMIN'
  - path: fromAddr
    name: substitute
    param: dummy@zuora.com
```

In the above example, "EmailTemplate" is an object in the notification service that represents the template for emails. A first scrubber rule specified for this data object type involves applying the data transformation of the "substitute" scrubber to the value in the data field given by the path "fromName." For this example rule, the scrubber parameter specified for instantiating the "substitute" scrubber is "John Smith," meaning that the data transformation involves replacing the value in the "fromName" field with the string "John Smith." This scrubber rule further specifies a filter: fromType=='ADMIN' which means that the data transformation of the scrubber rule may only be applied to those JSON file line whose "fromType" is "ADMIN." A second scrubber rule specified for this data object type involves again applying the data transformation of the "substitute" scrubber, but this time to the value in the data field given by the path "fromAddr." For this example rule, the scrubber parameter specified for instantiating the "substitute" scrubber is "dummy@zuora.com," meaning that the data transformation involves replacing the value in the "fromAddr" field (e.g., an email address of a subscriber of a tenant) with the string "dummy@zuora.com." The data transformations associated with the above-described example scrubber rules may be performed as part of a scrubbing operation to generate a sanitized copy of a tenant's data in which PII is replaced with generic placeholder value such as the generic name "John Smith" or the generic and non-functioning email address "dummy@zuora.com."

In some embodiments, if a scrubber rule contains only a filter, then it may be used to select the JSON lines that will be processed by the other scrubber rules defined for the data object. For example, for the following example YAML file, only those JSON lines whose "fromType" is "ADMIN" will be transformed by via application of the two subsequently defined scrubber rules and written to the final output.

```
EmailTemplate:
  - filter: fromType == 'ADMIN'
  - path: fromName
    name: substitute
    param: John Smith
  - path: fromAddr
    name: substitute
    param: dummy@zuora.com
```

In some embodiments, each scrubber rule 320 may be regarded as a mapping operation over a data stream. Similarly, each filter may be regarded as a filtering operation over the stream. The rules and filters may be used in any suitable order. For example, the following order of rules and filters: filter1, rule1, rule2, rule3 may be interpreted as stream operations stream.filter(filter1).map(rule1).map(rule2).filter(filter2).map(map3).

Referring again to FIG. 4, at block 406 of the method 400, the scrubbing service 322 may read a list of scrubber rules 320 from a YAML configuration file such as the example YAML files described above, and may proceed to scrub an input JSON line file line-by-line. As previously noted, each JSON line file may include JSON objects corresponding to a same data object type. Moreover, each JSON line may represent a distinct JSON data object of that data object type. In particular, each JSON line may be an independently processable entity to which the scrubber rules can be applied. The set of scrubber rules 320 applied to a JSON line file may be those that are specifically defined in connection with and associated with the data object type of the JSON lines in that JSON line file. The result of the scrubbing operations performed at block 406 may be scrubbed data 326.

Then, at block 408 of the method 400, the scrubbing service 322 may facilitate the importing of the scrubbed tenant data 326 into the target environment 304. In particular, the scrubbing service 322 may store the scrubbed tenant data 326 in a target bucket within data storage 316 that is associated with the target environment 304. The data importer 328 may then access the scrubbed data 326 from the target bucket and import it into the target environment 304 as a copy of existing tenant data in the target environment 304, for example. As discussed throughout, the scrubbing operations performed at block 506 may ensure that referential integrity of the scrubbed data 326 is maintained when imported into the target environment 304.

Figure 6:
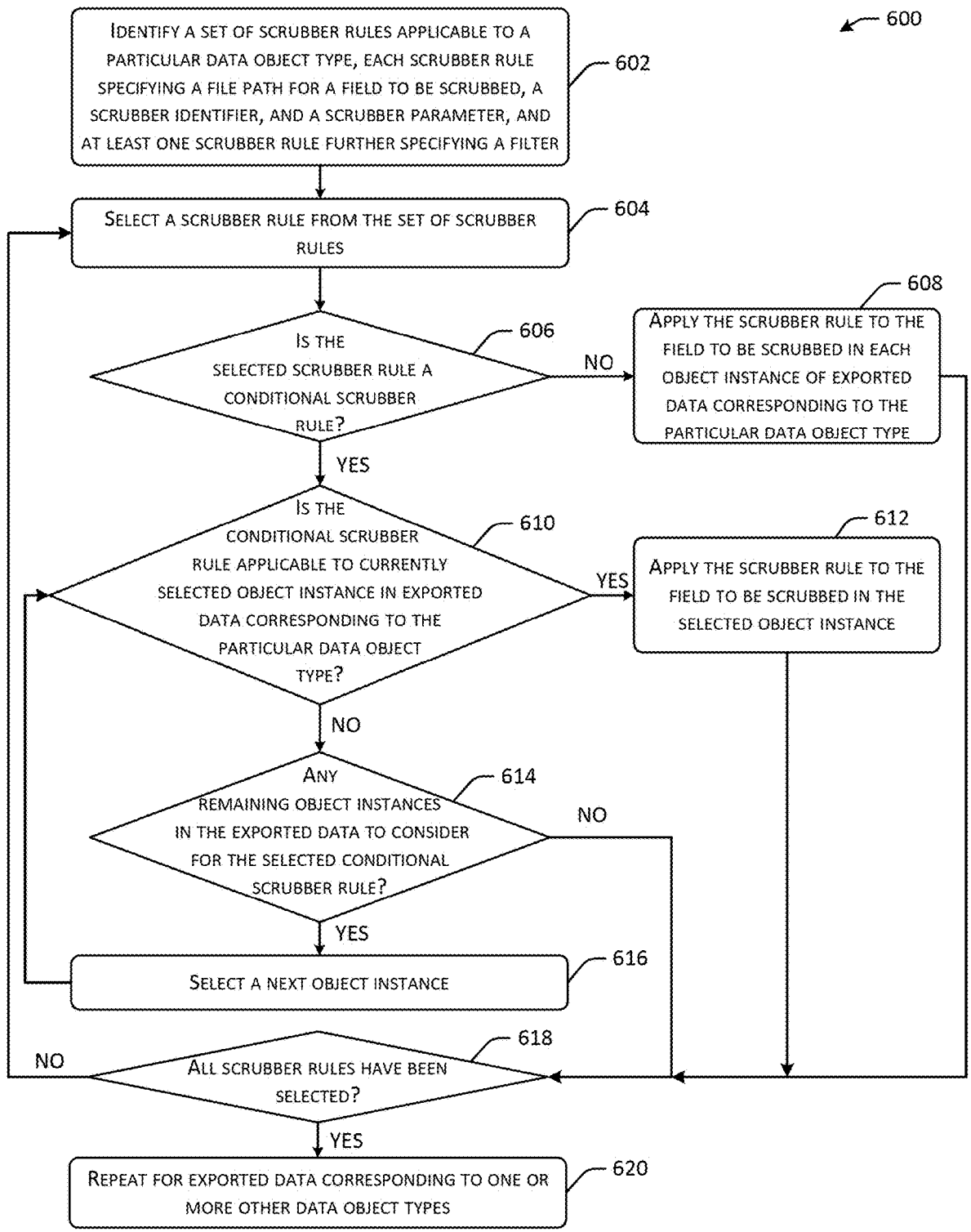
FIG. 6 is a flowchart of a more detailed illustrative method for performing data scrubbing in accordance with embodiments of the disclosed technology.

FIG. 6 is a flowchart of a more detailed illustrative method 600 for performing data scrubbing in accordance with embodiments of the disclosed technology. The method 600 describes application of a set of scrubber rules where at least one scrubber rule is a conditional scrubber rule that includes a filter. It should be appreciated, however, that in some embodiments, no scrubber rule defined for a given data object type may include a filter. It should further be appreciated that in some embodiments, a scrubber rule may only include a filter, and may be conditionally applied to determine those JSON lines to which one or more other scrubber rules will be applied. The method 600 will be described in the context of the example implementation 300 of FIG. 3.

Referring now to FIG. 6, at block 602 of the method 600, the scrubbing service 322 may identify a set of scrubber rules (e.g., some subset of the scrubber rules 320) applicable to a particular data object type. Each such scrubber rule may include a file path for a field to be scrubbed, an identifier of a scrubber to use, and a scrubber parameter based on which a scrubber is instantiated. Further, at least one scrubber rule may further include a filter.

At block 604 of the method 600, the scrubbing service 322 may select a scrubber rule from the identified set of scrubber rules. The scrubbing service 322 may utilize a pointer, a flag, a counter, or the like to keep track of which rules have been selected and which remain unselected as the scrubbing service iterates through the set of scrubber rules.

At block 606 of the method 600, the scrubbing service 322 may determine whether the selected scrubber rule is a conditional scrubber rule, that is, a scrubber rule that includes a filter. In response to a negative determination at block 606, the scrubbing service 322 may apply, at block 608, the selected scrubber rule to the field to be scrubbed (as identified by the file path) within each object instance in exported data corresponding to the particular data object type for which the identified set of scrubber rules are defined. For instance, the scrubbing service 322 may apply the selected non-conditional scrubber rule to each JSON line of a JSON line file corresponding to the particular data object type. More specifically, the scrubbing service 322 may execute the data transformation of the scrubber identified in the scrubber rule on the value contained in the field to be scrubbed. From block 608, the method 600 may proceed to block 618.

On the other hand, in response to a positive determination at block 606 indicating that the selected scrubber rule is a conditional scrubber rule, the scrubbing service 322 may determine whether selected conditional scrubber rule is applicable to a currently selected object instance in exported data corresponding to the particular data object type. That is, in some embodiments, the scrubbing service 322 may determine whether the conditional scrubber rule is applicable to a current JSON line in a JSON line file in which each JSON line is a JSON data object of the particular data object type. Determining whether the conditional scrubber rule is applicable to a current JSON line may include evaluating a Boolean expression to determine whether a specific value is in a specific data field of the JSON line. In some embodiments, the conditional scrubber rule may be used to process a given JSON line if the specific value is present in the specific data field (e.g., if a "fromType" field includes an "admin" value). In other embodiments, the conditional scrubber rule may be used to process a JSON line if a specific is not present in a specified data field. That is, in some embodiments, the conditional scrubber rule may be applied to a JSON line as long as a specific data field in the JSON line includes any value other than a specific prohibited value.

In response to a positive determination at block 610 indicating that the conditional scrubber rule is applicable to the currently selected object instance (e.g., the current JSON line), the method 600 may proceed to block 612 where the conditional scrubber rule may be applied to the field to be scrubbed in the selected object instance. More specifically, the scrubbing service 322 may execute the data transformation of the scrubber identified in the conditional scrubber rule on the value contained in the field to be scrubbed. Similar to block 608, from block 612, the method 600 may proceed to block 618.

In response to a negative determination at block 610 indicating that the conditional scrubber rule is not applicable to the currently selected object instance (e.g., the current JSON line), the scrubbing service 322 may determine, at block 614 of the method 600, whether there are any remaining object instances to consider for the selected conditional scrubber rule. For example, the scrubbing service 322 may determine whether there are any remaining JSON lines in the JSON line file to evaluate for applicability of the selected conditional scrubbing rule. In response to a positive determination at block 614 indicating there is at least one additional object instance to consider, the scrubbing service 322 may select a next object instance (e.g., a next JSON line) at block 616, and the method 600 may again proceed from block 610.

On the other hand, in response to a negative determination at block 614, the method may proceed to block 618. As noted, block 618 may be reached from blocks 608 and 612 as well as from a negative determination at block 614. At block 618 of the method 600, the scrubber service 322 may determine whether all scrubber rules have been selected. In response to a negative determination at block 618, the method 600 may again proceed from block 604 where a next, previously unselected scrubber rule may be selected. On the other hand, in response to a positive determination at block 616 indicating that all scrubber rules have been selected, evaluated for application to object instances, and applied to the object instances when determined to be applicable, the method 600 may be repeated for exported data relating to one or more other data object types.

FIG. 7 depicts an example UI 700 for viewing and creating scrubber jobs in accordance with embodiments of the disclosed technology. The scrubber management UI 700 may display a listing 704 of existing scrubber jobs. The UI 700 may be presented upon selection of a corresponding tab 702. The UI 700 may include a search field 706 to search for existing scrubber jobs as well as a selectable widget 708 to create a new scrubber job.

FIG. 8 depicts an example UI 800 for viewing scrubber tasks contained within a selected scrubber job in accordance with embodiments of the disclosed technology. In particular, drilling down into a particular scrubber job from the UI 700 may result in presentation of the UI 800 displaying a listing 802 of the various scrubber tasks contained within the selected scrubber job. The UI 800 may include a search field 804 for searching for particular scrubber tasks.

Figure 9:
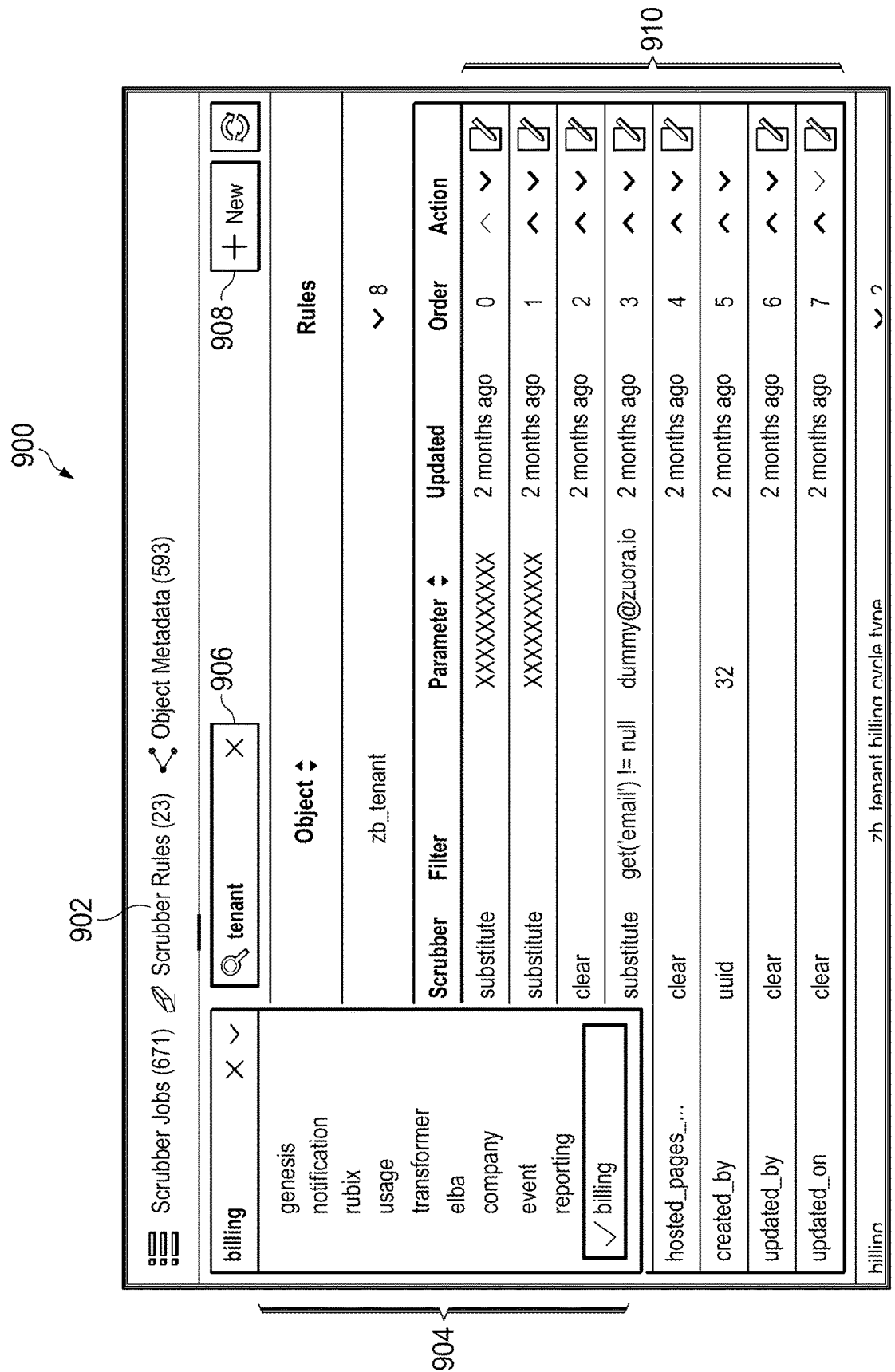
FIG. 9 depicts an example user interface for viewing and configuring scrubber rules in accordance with embodiments of the disclosed technology.

FIG. 9 depicts an example UI 900 for viewing and configuring scrubber rules in accordance with embodiments of the disclosed technology. The UI 900 may be presented upon selection of tab 902. The UI 900 may include a drop-down menu that displays a selectable listing 904 of services, such that selection of a service may result in corresponding scrubber rules being displayed in the UI 900. The UI 900 may further include a search field 906 for searching for scrubber rules and a selectable widget 908 for creating new scrubber rules. Scrubber rules may be configurable via the UI 900 and applicable at runtime for any given field, in any given table, or any given service.

FIG. 10 depicts an example UI 1000 for editing metadata of objects to be scrubbed in accordance with embodiments of the disclosed technology. The UI 1000 may be presented as an overlay over the UI 900 upon selection of tab 1002. The UI 1000 may allow a user to define the shape of the objects to be scrubbed.

Figure 11:
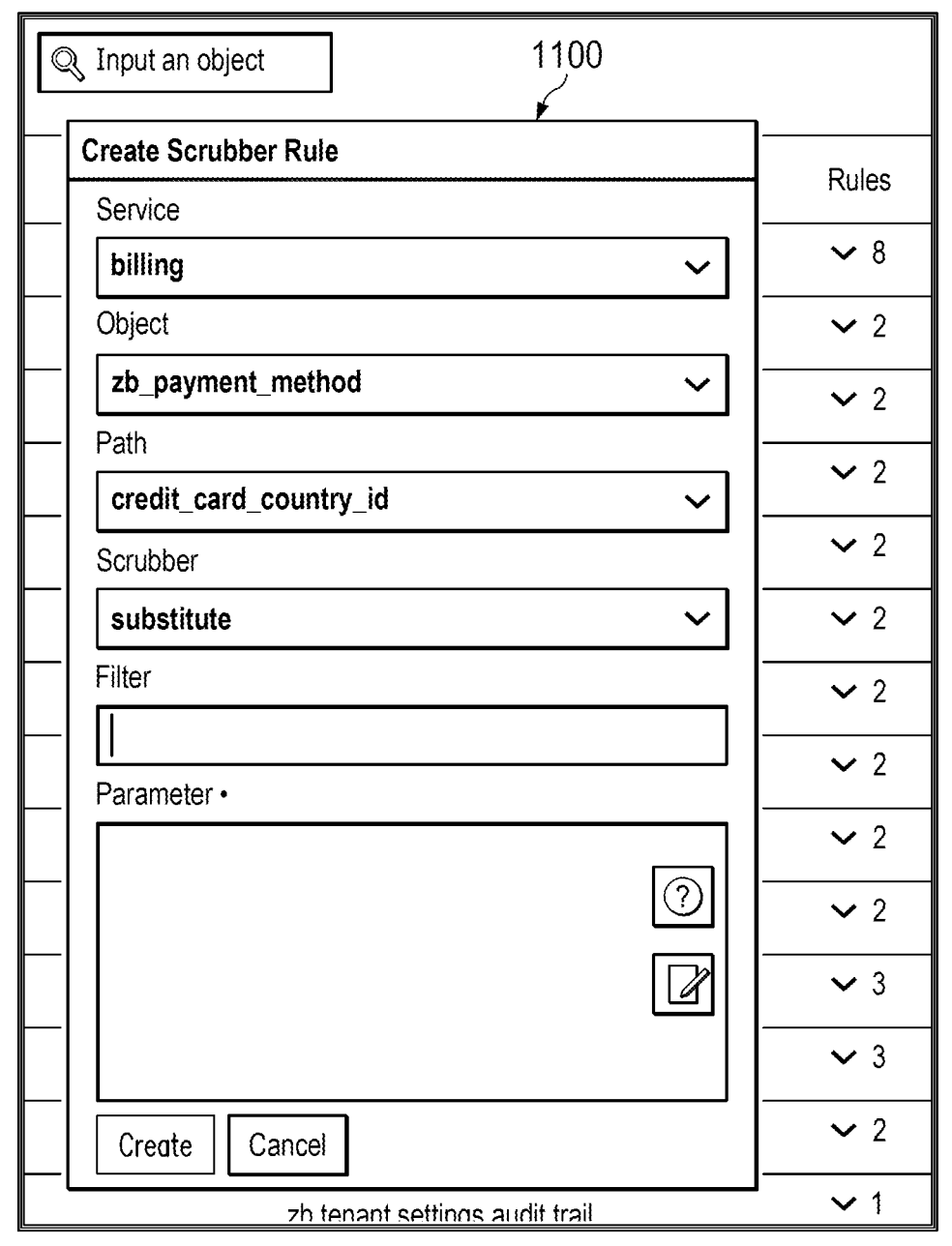

FIG. 11 depicts an example UI 1100 for defining a scrubber rule in accordance with embodiments of the disclosed technology. The UI 1100 includes various fields for specifying the service and the data object type to which the scrubber rule relates as well as the scrubber name, file path for the field to be scrubbed, a scrubber parameter, and optionally, a filter. In some embodiments, a scrubber rule may be created/defined at runtime for a given object.

Figure 12:
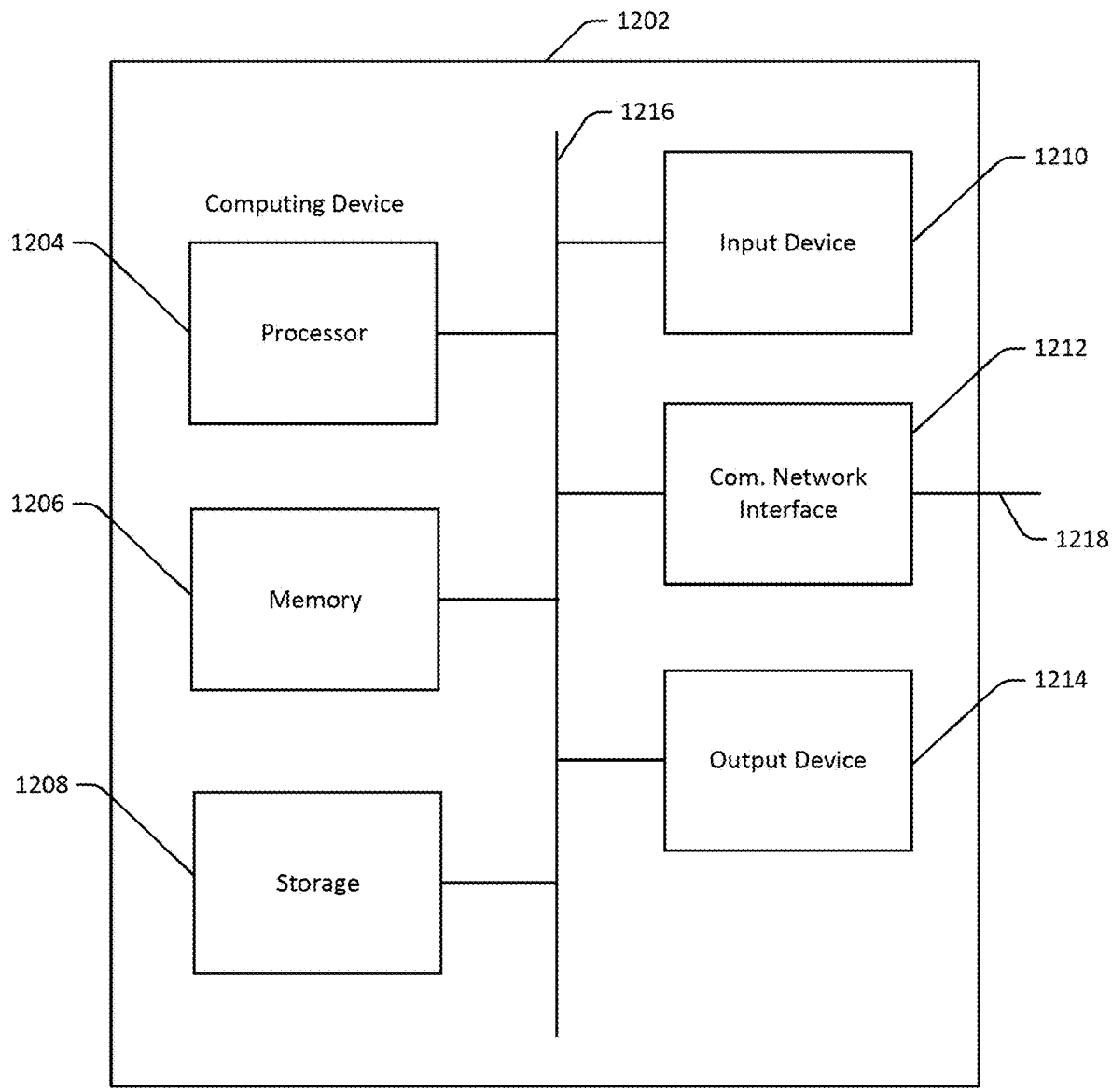
FIG. 12 is a block diagram depicting an example computing device that may form part of a computing system configured to implement features disclosed herein in accordance with embodiments of the disclosed technology.

FIG. 12 depicts a diagram of an example of a computing device 1202. Any of the systems, engines, data stores, and/or networks described herein may comprise one or more instances of the computing device 1202. In some embodiments, functionality of the computing device 1202 is improved to the perform some or all of the functionality described herein. The computing device 1202 comprises a processor 1204, memory 1206, storage 1208, an input device 1210, a communication network interface 1212, and an output device 1214 communicatively coupled to a communication channel 1216. The processor 1204 is configured to execute executable instructions (e.g., programs). In some embodiments, the processor 1204 comprises circuitry or any processor capable of processing the executable instructions.

The memory 1206 stores data. Some examples of memory 1206 include storage devices, such as RAM, ROM, RAM cache, virtual memory, etc. In various embodiments, working data is stored within the memory 1206. The data within the memory 1206 may be cleared or ultimately transferred to the storage 1208.

The storage 1208 includes any storage configured to retrieve and store data. Some examples of the storage 1208 include flash drives, hard drives, optical drives, cloud storage, and/or magnetic tape. Each of the memory system 1206 and the storage system 1208 comprises a computer-readable medium, which stores instructions or programs executable by processor 1204.

The input device 1210 is any device that inputs data (e.g., mouse and keyboard). The output device 1214 outputs data (e.g., a speaker or display). It will be appreciated that the storage 1208, input device 1210, and output device 1214 may be optional. For example, the routers/switchers may comprise the processor 1204 and memory 1206 as well as a device to receive and output data (e.g., the communication network interface 1212 and/or the output device 1214).

The communication network interface 1212 may be coupled to a network (e.g., network 108) via the link 1218. The communication network interface 1212 may support communication over an Ethernet connection, a serial connection, a parallel connection, and/or an ATA connection. The communication network interface 1212 may also support wireless communication (e.g., 802.12 a/b/g/n, WiMax, LTE, WiFi). It will be apparent that the communication network interface 1212 may support many wired and wireless standards.

It will be appreciated that the hardware elements of the computing device 1202 are not limited to those depicted in FIG. 12. A computing device 1202 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1204 and/or a co-processor located on a GPU (i.e., NVidia).

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently. The data store or database may include cloud storage. It will further be appreciated that the term "or," as used herein, may be construed in either an inclusive or exclusive sense. Moreover, plural instances may be provided for resources, operations, or structures described herein as a single instance.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, data stores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to embodiments. It will be apparent to those skilled in the art that various modifications may be made and other embodiments may be used without departing from the broader scope of the present invention(s). Therefore, these and other variations upon the embodiments are intended to be covered by the present invention(s).

What is claimed is:

1. A method of scrubbing tenant data in a multi-tenant system, the method comprising:
   accessing tenant data exported from a source data system, the tenant data being in a normalized data format, the tenant data including data objects;
   identifying at least a subset of the data objects of the tenant data associated with a particular data object type;
   identifying a set of scrubber rules associated with the particular data object type, each scrubber rule configured to apply a respective predefined transformation to an input value of a data object of the at least a subset of the data objects of the particular data object type to obtain a corresponding scrubbed value, a particular scrubber rule configured to perform a service to ensure referential integrity of the at least a subset of the data objects of the tenant data;
   applying the set of scrubber rules to the at least a subset of the data objects to obtain scrubbed tenant data; and
   facilitating importing of the scrubbed tenant data into a target data system.

2. The method of claim 1, wherein accessing the tenant data comprises accessing a data repository storing the tenant data in the normalized data format, and wherein facilitating importing of the scrubbed tenant data comprises making the scrubbed tenant data available to the target data system by storing the scrubbed tenant data in the data repository in the normalized data format.

3. The method of claim 2, wherein the tenant data is converted from a first native data format associated with the source data system to the normalized data format prior to being exported to the data repository.

4. The method of claim 3, wherein the scrubbed tenant data is converted from the normalized data format to a second native data format associated with the target data system prior to importing the scrubbed tenant data into the target data system.

5. The method of claim 1, further comprising:
   applying a respective additional set of scrubber rules to each of one or more additional subsets of the data objects of the tenant data to obtain additional scrubbed tenant data, wherein each additional subset of the data objects is associated with a respective corresponding additional data object type; and
   facilitating importing of the additional scrubbed tenant data into the target data system.

6. The method of claim 1, wherein the tenant data is associated with a particular tenant of a plurality of tenants in the multi-tenant system, wherein an existing copy of the tenant data is maintained in the target data system, and wherein the scrubbed tenant data is an additional copy of the tenant data that is imported into the target data system.

7. The method of claim 6, wherein the respective predefined transformation of a first rule in the set of scrubber rules comprises rewriting an object identifier in the tenant data to obtain a rewritten object identifier in the scrubbed tenant data.

8. The method of claim 7, wherein the rewritten object identifier maintains, at least in part, a referential integrity of the scrubbed tenant data after it is imported as the second copy of the tenant data into the target data system.

9. The method of claim 1, wherein each scrubber rule in the set of scrubber rules comprises a file path for an object field to be scrubbed, an identifier of a scrubber, and a scrubber parameter comprising an input value to be transformed by the scrubber.

10. The method of claim 9, wherein a first scrubber rule in the set of scrubber rules further comprises a filter, and wherein applying the set of scrubber rules to the at least a subset of the data objects of the tenant data comprises conditionally applying the first scrubber rule to the at least a subset of data objects of the tenant data.

11. The method of claim 10, wherein the conditionally applying the first scrubber rule to the at least a subset of data objects comprises, for each data object:
   determining, based on the filter, whether the first scrubber rule is applicable to the data object; and
   when it is determined that the first scrubber rule is applicable to the data object, applying the respective predefined transformation of the first scrubber rule to an input value contained in the object field to be scrubbed in the data object to obtain a corresponding scrubbed data object having a scrubbed value in the object field.

12. The method of claim 1, wherein the set of scrubber rules is applied to the at least a subset of the data objects of the tenant data as the tenant data is being replicated from the source data system to the target data system.

13. A system for scrubbing tenant data in a multi-tenant system, the system comprising:
   at least one memory storing computer-executable instructions; and
   at least one processor configured to access the at least one memory and execute the computer-executable instructions to:
   access tenant data exported from a source data system, the tenant data being in a normalized data format, the tenant data including data objects;

identify at least a subset of the data objects of the tenant data associated with a particular data object type;

identify a set of scrubber rules associated with the particular data object type, each scrubber rule configured to apply a respective predefined transformation to an input value of a data object of the at least a subset of the data objects of the particular data object type to obtain a corresponding scrubbed value, a particular scrubber rule configured to perform a service to ensure referential integrity of the at least a subset of the data objects of the tenant data;

apply the set of scrubber rules to the at least a subset of the data objects to obtain scrubbed tenant data; and facilitate importing of the scrubbed tenant data into a target data system.

14. The system of claim 13, wherein the at least one processor is configured to access the tenant data by executing the computer-executable instructions to access a data repository storing the tenant data in the normalized data format, and wherein the at least one processor is configured to facilitate importing of the scrubbed tenant data by executing the computer-executable instructions to make the scrubbed tenant data available to the target data system by storing the scrubbed tenant data in the data repository in the normalized data format.

15. The system of claim 14, wherein the tenant data is converted from a first native data format associated with the source data environment to the normalized data format prior to being exported to the data repository, and wherein the scrubbed tenant data is converted from the normalized data format to a second native data format associated with the target data system prior to importing the scrubbed tenant data into the target data system.

16. The system of claim 13, wherein the tenant data is associated with a particular tenant of a plurality of tenants in the multi-tenant system, wherein an existing copy of the tenant data is maintained in the target data system, and wherein the scrubbed tenant data is an additional copy of the tenant data that is imported into the target data system.

17. The system of claim 16, wherein the respective predefined transformation of a first rule in the set of scrubber rules comprises rewriting an object identifier in the tenant data to obtain a rewritten object identifier in the scrubbed tenant data, and wherein the rewritten object identifier maintains, at least in part, a referential integrity of the scrubbed tenant data after it is imported as the second copy of the tenant data into the target data system.

18. The system of claim 13, wherein each scrubber rule in the set of scrubber rules comprises a file path for an object field to be scrubbed, an identifier of a scrubber, and a scrubber parameter comprising an input value to be transformed by the scrubber.

19. The system of claim 18, wherein a first scrubber rule in the set of scrubber rules further comprises a filter, and wherein the at least one processor is configured to apply the set of scrubber rules to the at least a subset of the data objects of the tenant data by executing the computer-executable instructions to conditionally apply the first scrubber rule to the at least a subset of data objects of the tenant data.

20. The system of claim 19, wherein the at least one processor is configured to conditionally apply the first scrubber rule to the at least a subset of data objects by executing the computer-executable instructions to, for each data object in the set of data objects:

determine, based on the filter, whether the first scrubber rule is applicable to the data object; and when it is determined that the first scrubber rule is applicable to the data object, apply the respective predefined transformation of the first scrubber rule to an input value contained in the object field to be scrubbed in the data object to obtain a corresponding scrubbed data object having a scrubbed value in the object field.

21. The system of claim 13, wherein the system is a centralized data transformation system located remotely from the source data system and the target data system.

22. A computer program product for scrubbing tenant data in a multi-tenant system, the computer program product comprising a non-transitory computer-readable medium readable by a processing circuit, the non-transitory computer-readable medium storing instructions executable by the processing circuit to cause a method to be performed, the method comprising:

accessing tenant data exported from a source data system, the tenant data being in a normalized data format, the tenant data including data objects;

identifying at least a subset of the data objects of the tenant data associated with a particular data object type;

identifying a set of scrubber rules associated with the particular data object type, each scrubber rule configured to apply a respective predefined transformation to an input value of a data object of the at least a subset of the data objects of the particular data object type to obtain a corresponding scrubbed value, a particular scrubber rule configured to perform a service to ensure referential integrity of the at least a subset of the data objects of the tenant data;

applying the set of scrubber rules to the at least a subset of the data objects to obtain scrubbed tenant data; and facilitating importing of the scrubbed tenant data into a target data system.

* * * * *